United States Patent
Lifschitz Arribio et al.

(10) Patent No.: US 12,448,523 B2
(45) Date of Patent: Oct. 21, 2025

(54) STABILIZATION OF TITANIUM OXIDE FILMS FOR HIGHLY TRANSPARENT COATINGS

(71) Applicant: Meta Platforms Technologies, LLC, Menlo Park, CA (US)

(72) Inventors: Alejo Lifschitz Arribio, Redmond, WA (US); Anthony Phan, Redmond, WA (US)

( * ) Notice: Subject to any disclaimer, the term of this patent is extended or adjusted under 35 U.S.C. 154(b) by 0 days.

(21) Appl. No.: 18/147,581

(22) Filed: Dec. 28, 2022

(65) Prior Publication Data

US 2023/0220214 A1 Jul. 13, 2023

Related U.S. Application Data

(60) Provisional application No. 63/299,266, filed on Jan. 13, 2022.

(51) Int. Cl.
| | | |
|---|---|---|
| C09D 1/00 | (2006.01) | |
| C09D 5/02 | (2006.01) | |
| (Continued) | | |

(52) U.S. Cl.
CPC .............. *C09D 1/00* (2013.01); *C09D 5/02* (2013.01); *C09D 7/48* (2018.01); *C09D 7/61* (2018.01);
(Continued)

(58) Field of Classification Search
CPC ... C09D 1/00; C09D 5/02; C09D 7/48; C09D 7/61; C09D 11/023; C09D 11/037;
(Continued)

(56) References Cited

U.S. PATENT DOCUMENTS

| | | |
|---|---|---|
| 9,221,214 B2 | 12/2015 | Takahashi et al. |
| 10,941,163 B2 | 3/2021 | Dilocker et al. |
| | (Continued) | |

FOREIGN PATENT DOCUMENTS

| | | |
|---|---|---|
| JP | 2002356320 A | 12/2002 |
| JP | 4521801 B2 | 8/2010 |
| | (Continued) | |

OTHER PUBLICATIONS

Barhoum M., et al., "Rapid Sol-Gel Fabrication of High-Quality Thin-Film Stacks on Planar and Curved Substrates," Chemistry of Materials, 2011, 23(23), pp. 5177-5184.
(Continued)

*Primary Examiner* — Mark Kopec
*Assistant Examiner* — Jaison P Thomas
(74) *Attorney, Agent, or Firm* — Greenberg Traurig, LLP

(57) ABSTRACT

A sol-gel material for overcoating a surface-relief structure includes a titanium(IV) precursor, and a titanium oxide stabilizer including $R^3OC(O)OR^4$, $R^5C(O)OR^6$, or a combination. $R^3$ and $R^4$ include alkyl or alkene groups optionally containing carboxylate, alcohol, or ester functionalities, such as propylene carbonate (PC). $R^5$ and $R^6$ include alkyl or alkene groups optionally containing carboxylate, alcohol, or ester functionalities, for example, a lactone such as gamma butyrolactone (GBL). In some embodiments, the sol-gel material includes a source of sulfate or phosphate anions, an acid, a base, a peroxide, a surfactant, a crosslinker, a flexibilizer, a toughener additive, a solvent, or a combination thereof. In some embodiments, the sol-gel material is annealed at a temperature between 50-150° C., and then annealed at a temperature between 200-300° C. In some embodiments, the sol-gel material is cured using ultraviolet light before annealing at a temperature between 200-300° C.

12 Claims, 15 Drawing Sheets

(51) Int. Cl.

| | |
|---|---|
| *C09D 7/48* | (2018.01) |
| *C09D 7/61* | (2018.01) |
| *C09D 11/023* | (2014.01) |
| *C09D 11/037* | (2014.01) |
| *C09D 11/322* | (2014.01) |
| *C09D 11/38* | (2014.01) |
| *G02B 27/01* | (2006.01) |

(52) U.S. Cl.
CPC .......... *C09D 11/023* (2013.01); *C09D 11/037* (2013.01); *C09D 11/322* (2013.01); *C09D 11/38* (2013.01); *G02B 27/0172* (2013.01); *G02B 2027/0178* (2013.01)

(58) Field of Classification Search
CPC .. C09D 11/322; C09D 11/38; G02B 27/0172; G02B 2027/0178; G02B 1/10; C08K 5/10
See application file for complete search history.

(56) References Cited

U.S. PATENT DOCUMENTS

| | | | |
|---|---|---|---|
| 2005/0277274 A1* | 12/2005 | Karkkainen | C09D 1/00 438/496 |
| 2008/0022896 A1* | 1/2008 | Karkkainen | C01G 23/053 106/285 |
| 2013/0093176 A1 | 4/2013 | Lok et al. | |
| 2015/0024539 A1* | 1/2015 | Brohan | H01L 31/032 60/641.1 |

FOREIGN PATENT DOCUMENTS

| | | | | |
|---|---|---|---|---|
| JP | 2011026365 A | 2/2011 | | |
| JP | 4942053 B2 * | 5/2012 | ........... | C01G 23/053 |
| WO | WO-2011043018 A1 | 4/2011 | | |

OTHER PUBLICATIONS

Bharti B., et al., "Formation of Oxygen Vacancies and $Ti^{3+}$ State in $TiO_2$ Thin Film and Enhanced Optical Properties by Air Plasma Treatment," Scientific Reports, Aug. 30, 2016, vol. 6, No. 32355, 12 pages.
Blanco E., et al., "Insights into the Annealing Process of Sol-Gel $TiO_2$ Films Leading to Anatase Development: The Interrelationship between Microstructure and Optical Properties," Applied Surface Science, 2018, vol. 439, 32 pages.
Coppens P., et al., "Crystallography and Properties of Polyoxotitanate Nanoclusters," Chemical Reviews, May 2014, vol. 114, pp. 9645-9661.
Gareso P.L., et al., "Influence of Annealing on Structural and Optical Properties of n-$TiO_2$ Thin Films Grown by Sol-Gel Spin Coating," Journal of Physics: Conference Series, 2019, vol. 1242, 012037, 8 pages.
Joost U., et al., "Reversible Photodoping of TiO2 Nanoparticles for Photochromic Applications," Chemistry of Materials, Dec. 10, 2018, vol. 30, No. 24, 7 pages.
Khan M.E., "Microbial Fuel Cell Assisted Band Gap Narrowed $TiO_2$ for Visible Light-Induced Photocatalytic Activities and Power Generation," Scientific Reports, Jan. 29, 2018, vol. 08, 12 pages.
Liang Y., et al., "The Preparation of $TiO_2$ Film by the Sol-Gel Method and Evaluation of Its Self-Cleaning Property," Materials, Mar. 19, 2018, vol. 11(3), 12 pages.
Lu Y., et al., "Modifying the Surface Properties of Superparamagnetic Iron Oxide Nanoparticles through A Sol-Gel Approach," Nano Letters, 2002, vol. 2, No. 3, pp. 183-186.
Luttrell T., et al., "Why is Anatase a Better Photocatalyst than Rutile? Model Studies on Epitaxial TiO2 Films," Scientific Reports, Feb. 10, 2014, vol. 04, 8 pages.
Macyk W., et al., "Titanium(IV) Complexes as Direct $Tio_2$ Photosensitizers," Coordination Chemistry Reviews, Nov. 2010, vol. 254, No. 21-22, pp. 2687-2701.
Matthews P.D., et al., "Structure, Photochemistry and Applications of Metal-Doped Polyoxotitanium Alkoxide Cages," Chemical Communications, Jul. 2014, vol. 50, pp. 12815-12823.
Naceur J.B., et al., "Annealing Effects on Microstructural and Optical Properties of Nanostructured-Tio2 Thin Films Prepared by Sol-Gel Technique," Current Applied Physics, Mar. 2012, vol. 12, No. 02, pp. 422-428.
Rozes L., et al., "Titanium Oxo-Clusters: Precursors for a Lego-Like Construction of Nanostructured Hybrid Materials," Chemical Society Reviews, 2011, vol. 40, pp. 1006-1030.
Sano K., et al., "Optically Transparent Colloidal Dispersion of TiO2 Nanoparticles Storable for longer than One year Prepared by Sol/Gel Progressive Hydrolysis/Condensation," ACS Applied Materials & Interfaces, 2020, 12(40), 13 pages.
Shinen M.H., et al., "Preparation of High Transmittance $TiO_2$ Thin Films by Sol-Gel Technique as Antireflection Coating," Journal of Physics: Conference Series, Feb. 21-22, 2018, vol. 1032, 12 pages.
Sta I., et al., "Structural and Optical Properties of $TiO_2$ Thin Films Prepared by Spin Coating," Journal of Sol-Gel Science and Technology, Jul. 29, 2014, vol. 72, 7 pages.
Taherniya A., et al., "Thickness Dependence of Structural, Optical and Morphological Properties of Sol-Gel Derived $TiO_2$ Thin Film," Materials Research Express, 2019, vol. 6, 20 pages.
Tandy Li.M.F., et al., "Reversible Photochromic Effect in the Tio2-Polymer Hybrid System," Journal of Sol-Gel Science and Technology, Jan. 3, 2017, vol. 82, 8 pages.
Tanski T., et al., "Influence of Calcination Temperature on Optical and Structural Properties of $TiO_2$ Thin Films Prepared by Means of Sol-Gel and Spin Coating," Bulletin of the Polish Academy of Sciences Technical Sciences, 2018, vol. 66, No. 2, pp. 151-156.
Ullah I., et al., "Sol-gel Synthesis and Optical Properties of Titanium Dioxide Thin Film," Modern Physics Letters B, Mar. 12, 2018, vol. 32, No. 9, 1850076, 10 pages.
Wu Q., et al., "Ultra-Small Yellow Defective Tio2 Nanoparticles for Co-Catalyst Free Photocatalytic Hydrogen Production," Nano Energy, Jun. 2016, vol. 24, pp. 63-71.
Yan L., et al., "Porous TiO2 Conformal Coating on Carbon Nanotubes as Energy Storage Materials," Electrochimica Acta, 2015, vol. 169, pp. 73-81.
Zhuo C.X., et al., "Catalytic Asymmetric Dearomatization Reactions," Angewandte International Edition Chemie, Dec. 3, 2012, vol. 51, pp. 12662-12686.
Dunuwila D.D., et al., "Application of Controlled Hydrolysis of Titanium (IV) Isopropoxide to Produce Sol-Gel-Derived Thin Films," Chemistry of materials, Sep. 1, 1994, vol. 06, No. 09, pp. 1556-1562.
International Search Report and Written Opinion for International Application No. PCT/US2023/010613, mailed May 2, 2023, 9 pages.

* cited by examiner

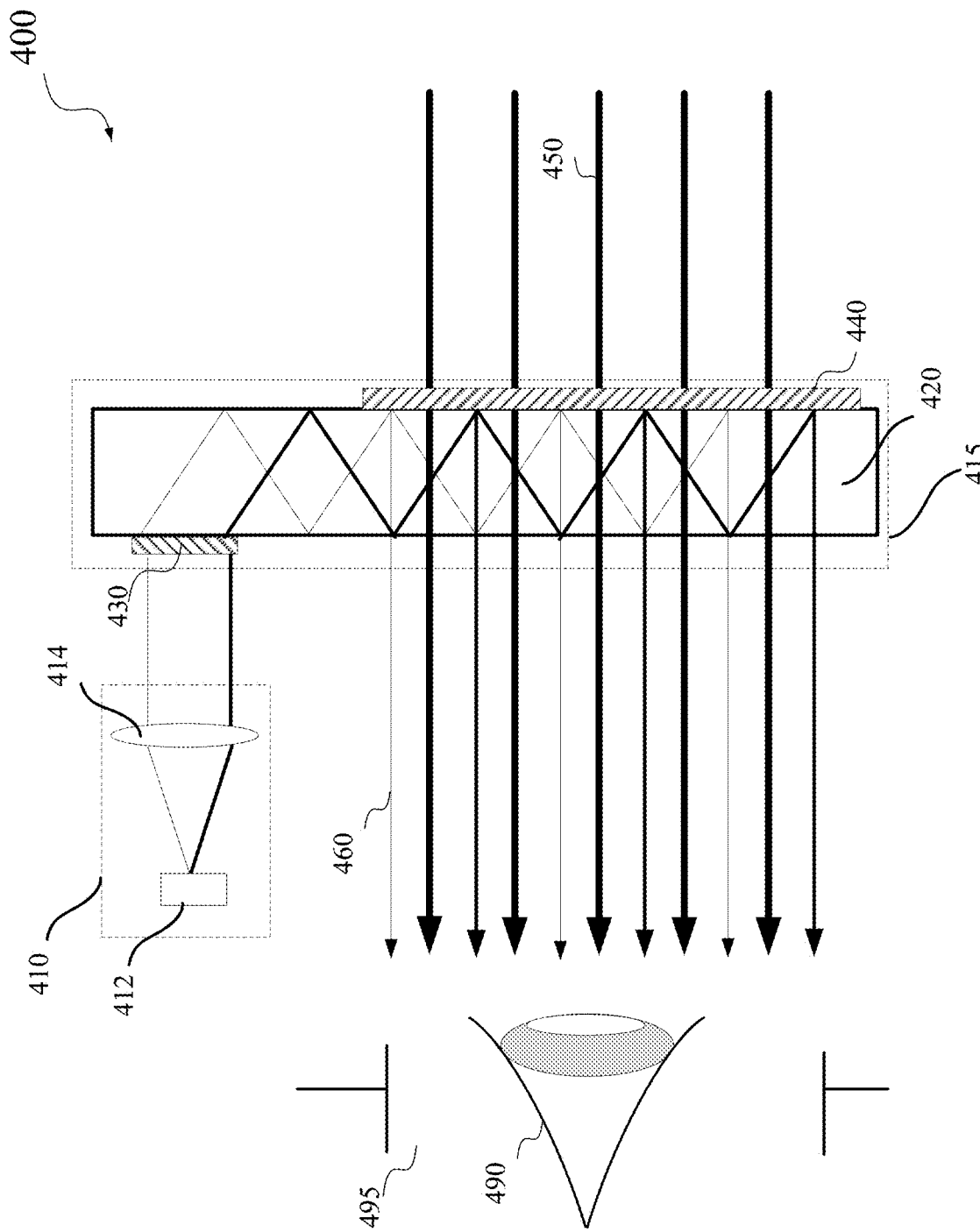

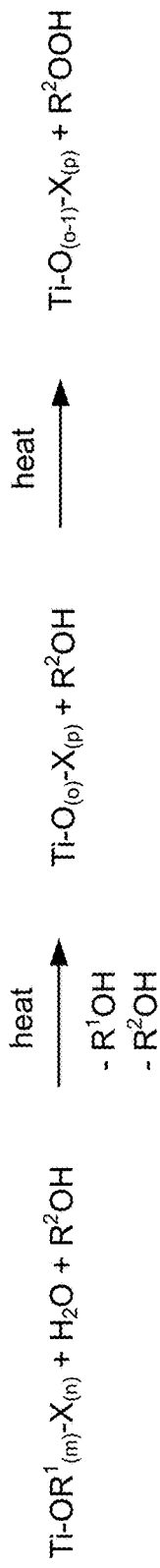
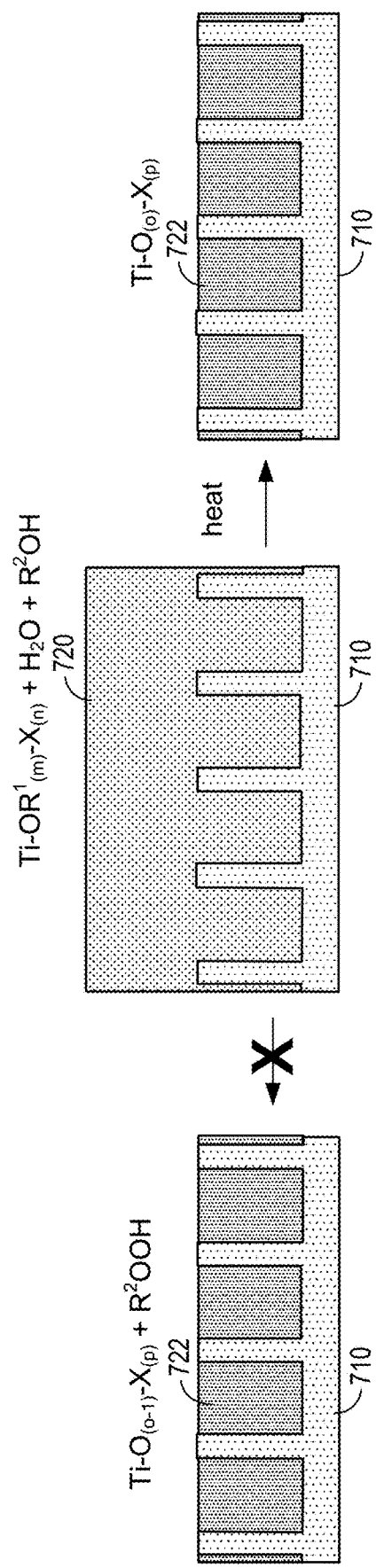
FIG. 7A
FIG. 7B

| Run | Component 1 | Component 1 Concentration | Component 2 | Component 2 Concentration | Component 3 | Component 3 Concentration | Dilution | Substrate pre-cleaning | Temperature | RI @ 520 nm | Abs % @ 460 nm / 100 nm | Recessed feature fill |
|---|---|---|---|---|---|---|---|---|---|---|---|---|
| 1 | 25% Ti-O-SO$_4$ + 0.75% HNO$_3$ in water | 20% | None | None | None | None | PGME | None | 300 °C | 1.81 | 0.17 / 0.19 | YES |
| 2 | 25% Ti-O-SO$_4$ + 0.75% HNO$_3$ in water | 20% | IPA | 2.50% | 30% H$_2$O$_2$ | 0.5% | PGME | None | 300 °C | 1.79 | 0.03 / 0.00 | YES |
| 3 | 25% Ti-O-SO$_4$ + 0.75% HNO$_3$ in water | 20% | None | None | None | None | PGME | 5 min O$_2$ plasma | 300 °C | 1.80 | 7.69 / 8.11 | YES |
| 4 | 25% Ti-O-SO$_4$ + 0.75% HNO$_3$ in water | 20% | IPA | 2.50% | 30% H$_2$O$_2$ | 0.5% | PGME | 5 min O$_2$ plasma | 300 °C | 1.79 | 2.48 / 2.76 | YES |

FIG. 10

| Run | Component 1 | Component 1 Concentration | Component 2 | Component 2 Concentration | Component 3 | Component 3 Concentration | Dilution | Substrate pre-cleaning | Temperature | RI @ 520 nm | Abs % @ 460 nm / 100 nm | Recessed feature fill |
|---|---|---|---|---|---|---|---|---|---|---|---|---|
| 5 | 25% Ti-O-SO$_4$ + 0.75% HNO$_3$ in water | 20% | IPA | 2.50% | 30% H$_2$O$_2$ | 0.5% | PGME | 5 min O$_2$ plasma | 50°C (1 min) then 300°C (1 min) | 1.81 | 1.28 / 1.24 | YES |
| 6 | 25% Ti-O-SO$_4$ + 0.75% HNO$_3$ in water | 20% | IPA | 2.50% | 30% H$_2$O$_2$ | 0.5% | PGME | 5 min O$_2$ plasma | 150°C (1 min) then 300°C (1 min) | 1.79 | 1.69 / 1.74 | YES |
| 7 | 25% Ti-O-SO$_4$ + 0.75% HNO$_3$ in water | 20% | IPA | 2.50% | 30% H$_2$O$_2$ | 0.5% | PGME | 5 min O$_2$ plasma | 300°C (1 min) then 300°C (1 min) | 1.79 | 2.14 / 2.11 | YES |

| Run | Component 1 | Component 1 Concentration | Component 2 | Component 2 Concentration | Dilution | Substrate pre-cleaning | Temperature | RI @ 520 nm | Abs % @ 460 nm / 100 nm |
|---|---|---|---|---|---|---|---|---|---|
| 8 | 25% Ti-O-SO₄ + 0.5% HNO₃ in water | 20% | DPGME | 40% | PGME | 5 min O₂ plasma | 300 °C | 1.78 | 9.89 / 10.23 |
| 9 | | | PGMEA | 40% | PGME | | | 1.81 | 5.35 / 5.77 |
| 10 | | | TPM | 40% | PGME | | | 1.82 | 13.06 / 12.31 |
| 11 | | | 1,2-butane diol | 40% | PGME | | | 1.81 | 20.20 / 19.56 |
| 12 | | | 1,3-butane diol | 40% | PGME | | | 1.82 | 28.31 / 25.97 |
| 13 | | | Triethylene Glycol | 40% | PGME | | | 1.60 | 23.34 / 24.14 |

FIG. 13

| Run | Component 1 | Component 1 Concentration | Component 2 | Component 2 Concentration | Component 3 | Component 3 Concentration | Dilution | Substrate pre-cleaning | Temperature | RI @ 520 nm | Abs % @ 460 nm / 100 nm |
|---|---|---|---|---|---|---|---|---|---|---|---|
| 14 | 25% Ti-O-SO₄ + 0.75% HNO₃ in water | 20% | GBL | 40% | None | | PGME | 5 min O₂ plasma | 300 °C | 1.80 | 0.67 / 0.73 |
| 15 | | | AcOH | 5% | | | PGME | | | 1.70 | 0.11 / 0.07 |
| 16 | | | GBL | 40% | Propylene Carbonate | 1% | PGME | | | 1.80 | 0.85 / 0.98 |

FIG. 14

| Run | Component 1 | Component 1 Concentration | Component 2 | Component 2 Concentration | Dilution | Substrate | Coating | Temperature | RI @ 520 nm | Abs % @ 460 nm /100 nm |
|---|---|---|---|---|---|---|---|---|---|---|
| 17 | 25% Ti-O-SO$_4$ + 0.5% HNO$_3$ in water | 20% | PGME | 10% | GBL | Fused Si | 1500 rpm | 75°C (1 min), then 300°C (1 min) | 1.80 | 0.22 / 0.13 |
| 18 | | | | | | | | 90°C (1 min), then 300°C (1 min) | 1.80 | 0.28 / 0.21 |
| 19 | | | | | | | | 110°C (1 min), then 300°C (1 min) | 1.80 | 0.43 / 0.34 |
| 20 | | | | | | | | 125°C (1 min), then 300°C (1 min) | 1.81 | 0.52 / 0.49 |
| 21 | | | | | | | | 140°C (1 min), then 300°C (1 min) | 1.80 | 0.77 / 0.82 |

FIG. 15

| Run | Component 1 | Component 1 Concentration | Component 2 | Component 2 Concentration | Dilution | Substrate | Coating | Temperature | RI @ 520 nm | Abs % @ 460 nm /100 nm |
|---|---|---|---|---|---|---|---|---|---|---|
| 22 | 25% Ti-O-SO$_4$ + 0.5% HNO$_3$ in water | 20% | PGME | 10% | GBL | Fused Si | 1500 rpm | 75°C (2.5 min), then 300°C (1 min) | 1.80 | 0.12 / 0.09 |
| 23 | | | | | GBL | | | 75°C (5 min), then 300°C (1 min) | 1.80 | 0.13 / 0.04 |

| Run | Component 1 | Component 1 Concentration | Component 2 | Component 2 Concentration | Component 3 | Component 3 Concentration | Dilution | Temperature | Abs % @ 460 nm / 100 nm |
|---|---|---|---|---|---|---|---|---|---|
| 27 | 25% Ti-O-SO₄ + 0.5% HNO₃ in water | 20% | 1,2-Butane Diol | 40% | None | None | PGME | 300 °C (5 min) | 20.20 / 19.56 |
| 28 | 25% Ti-O-SO₄ + 0.5% HNO₃ in water | 20% | None | None | None | None | PGME | 300 °C (5 min) | 7.69 / 9.11 |
| 29 | 25% Ti-O-SO₄ + 0.5% HNO₃ in water | 20% | PGME | 10% | Propylene Carbonate | 1% | GBL | 300 °C (1 min) | 0.85 / 0.98 |
| 30 | 25% Ti-O-SO₄ + 0.5% HNO₃ in water | 20% | PGME | 10% | Propylene Carbonate | 1% | GBL | 75 °C (5 min), then 300 °C (1 min) | 0.08 / 0.00 |

FIG. 17

STABILIZATION OF TITANIUM OXIDE FILMS FOR HIGHLY TRANSPARENT COATINGS

CROSS-REFERENCE TO RELATED APPLICATION

This application claims the benefit of and priority to U.S. Provisional Application No. 63/299,266, filed Jan. 13, 2022, entitled "STABILIZATION OF TITANIUM OXIDE FILMS FOR HIGHLY TRANSPARENT COATINGS," which is herein incorporated by reference in its entirety for all purposes.

BACKGROUND

A sol-gel material is composed of a solution comprising a metal oxide precursor that may have been at least partially condensed into an extended network. Upon coating and thermal annealing of the solution, precursor ligands and solvents may be thermally removed to fully condense the extended network into an oxide film. The condensation process may result in densification and, potentially, crystallization. Thus, when applied onto a substrate and annealed, sol-gel materials can form transparent, high-refractive index coatings.

SUMMARY

This disclosure relates generally to sol-gel overcoating materials. More specifically, techniques disclosed herein relate to sol-gel materials including a metal oxide stabilizer that can stabilize high-index metal oxides (e.g., $TiO_2$) or metal oxysulfates (e.g., $Ti-O-SO_4$) via in-situ production of carboxylate groups to prevent interactions between the metal oxides and the environment and/or residual organics, thereby improving the transparency of the sol-gel overcoating layer that superconformally fills surface-relief structures. Various inventive embodiments are described herein, including devices, systems, methods, materials, processes, compositions, and the like.

According to certain embodiments, a sol-gel material for overcoating surface-relief structures may include at least one titanium(IV) precursor; and a titanium oxide stabilizer including $R^3OC(O)OR^4$, $R^5C(O)OR^6$, or a combination. $R^3$ and $R^4$ may include alkyl or alkene groups that may optionally include carboxylate, alcohol, and/or ester functionalities and may optionally be catenated to form a heterocycle. In some embodiments, the titanium oxide stabilizer may include propylene carbonate (PC). In some embodiments, the titanium oxide stabilizer may include $R^3OC(O)OR^4$ in a range of 0.1-10% by mass. $R^5$ and $R^6$ may include alkyl or alkene groups that may optionally include carboxylate, alcohol, and/or ester functionalities and may optionally be catenated to form a heterocycle. In some embodiments, the titanium oxide stabilizer may include a lactone, such as gamma butyrolactone (GBL). In some embodiments, the titanium oxide stabilizer may include $R^5C(O)OR^6$ in a range of 0.1-50% by mass. In some embodiments, the titanium(IV) precursor may include $Ti-OR^1_{(m)}-X_{(n)}$, where $R^1$ may include an organic group such as an alkyl or alkene group that may optionally include carboxylate, alcohol, and/or ester functionalities and may optionally be catenated to form a heterocycle. X may include a halide (e.g., fluoride, chloride, or bromide), sulfate, or phosphate.

In some embodiments, the sol-gel material, when coated onto a substrate and annealed at a temperature below about 300° C. for less than about 10 minutes, may form a coating with a refractive index in a range of 1.6-1.9 and an absorption rate for visible light less than about 0.1% per 100 nm. In some embodiments, the sol-gel material may fill recessed features on a substrate in a superconformal fashion without leading to voiding upon full thermal densification of the sol-gel material. In some embodiments, the sol-gel material may include a source of sulfate or phosphate anions, an acid, a base, a peroxide, a surfactant, a cross-linker, a flexibilizer, a toughener additive, a solvent, or a combination thereof. In some embodiments, the sol-gel material may include a solvent with a boiling point greater than 140° C.

According to certain embodiments, a method may include depositing, on a surface-relief structure, a layer of the sol-gel material and annealing the layer of the sol-gel material at temperatures lower than or equal to 300° C. to superconformally fill the surface-relief structure with the sol-gel material. In some embodiments, the annealing may include annealing, in a first annealing process, the layer of the sol-gel material at a temperature between 50-150° C.; and annealing, in a second annealing process, the layer of the sol-gel material at a temperature between 200-300° C. In some embodiments, the method may include, between the first annealing process and the second annealing process, curing the layer of the sol-gel material using ultraviolet light.

In some embodiments, depositing the layer of the sol-gel material may include selectively depositing the layer of the sol-gel material using a selective deposition technique. Selectively depositing the layer of the sol-gel material may include depositing the layer of the sol-gel material on selected regions of the surface-relief structure, depositing different amounts of the sol-gel material on different regions of the surface-relief structure, or a combination. The selective deposition technique may include spray coating, three-dimensional printing, screen printing, ink-jet printing, or a combination In some embodiments, the surface-relief structure may include gratings, trenches, vias, through-holes, or a combination. In some embodiments, the surface-relief structure may include features characterized by a width of 1-300 nm and a depth of 1-2000 nm. In some embodiments, after the annealing, a final thickness of the layer of the sol-gel material on a top surface of the surface-relief structure is less than 50 nm, and the layer of the sol-gel material fully fills the surface-relief structure in a void-free fashion. In some embodiments, after the annealing, a refractive index of the layer of the sol-gel material may be between 1.6 and 1.9, and an absorption rate of the layer of the sol-gel material may be lower than 0.1% per 100 nm for visible light.

According to certain embodiments, a device may include a surface-relief structure, and an overcoat layer on the surface-relief structure and filling the surface-relief structure, the overcoat layer being made of the sol-gel material described above. For example, the overcoat layer may include a metal oxide (e.g., titanium oxide) and one or more carboxylate or carbonate groups. In some embodiments, a refractive index of the overcoat layer may be between 1.6 and 1.9. In some embodiments, an absorption rate of the overcoat layer is lower than 0.1% per 100 nm for visible light. In some embodiments, the surface-relief structure may include gratings, trenches, vias, through-holes, or a combination. In some embodiments, the surface-relief structure may include features characterized by a width of 1-300 nm and a depth of 1-2000 nm. In some embodiments, a thickness of the overcoat layer on a top surface of the surface-relief structure may be less than 50 nm, and the overcoat layer may fully fill the surface-relief structure in a void-free fashion.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

Illustrative embodiments are described in detail below with reference to the following figures.

FIG. 4 illustrates an example of an optical see-through augmented reality system including a waveguide display according to certain embodiments.

FIG. 7A illustrates an example of a process in which thermal condensation of titanium-based sol-gel at low temperatures (e.g., less than about 500° C.) may lead to increased electronic absorption over time due to oxidation of organic components.

FIG. 7B illustrates an example where it may be desirable to prevent interactions of the $Ti-O_{(o)}-X_{(p)}$ centers with the environment or residual organics that may increase the absorption of a sol-gel overcoat layer.

FIG. 10 shows material compositions, processes, and performance of comparative examples 1-4.

FIG. 11 shows material compositions, processes, and performance of comparative examples 5-7.

FIG. 12 shows material compositions, processes, and performance of comparative examples 8-13.

FIG. 13 shows material compositions, processes, and performance of working examples 14-16 according to certain embodiments.

FIG. 14 shows material compositions, processes, and performance of working examples 17-21 according to certain embodiments.

FIG. 15 shows material compositions, processes, and performance of working examples 22-23 according to certain embodiments.

FIG. 17 shows material compositions, processes, and performance of working examples 27-30 according to certain embodiments.

Figure 1:
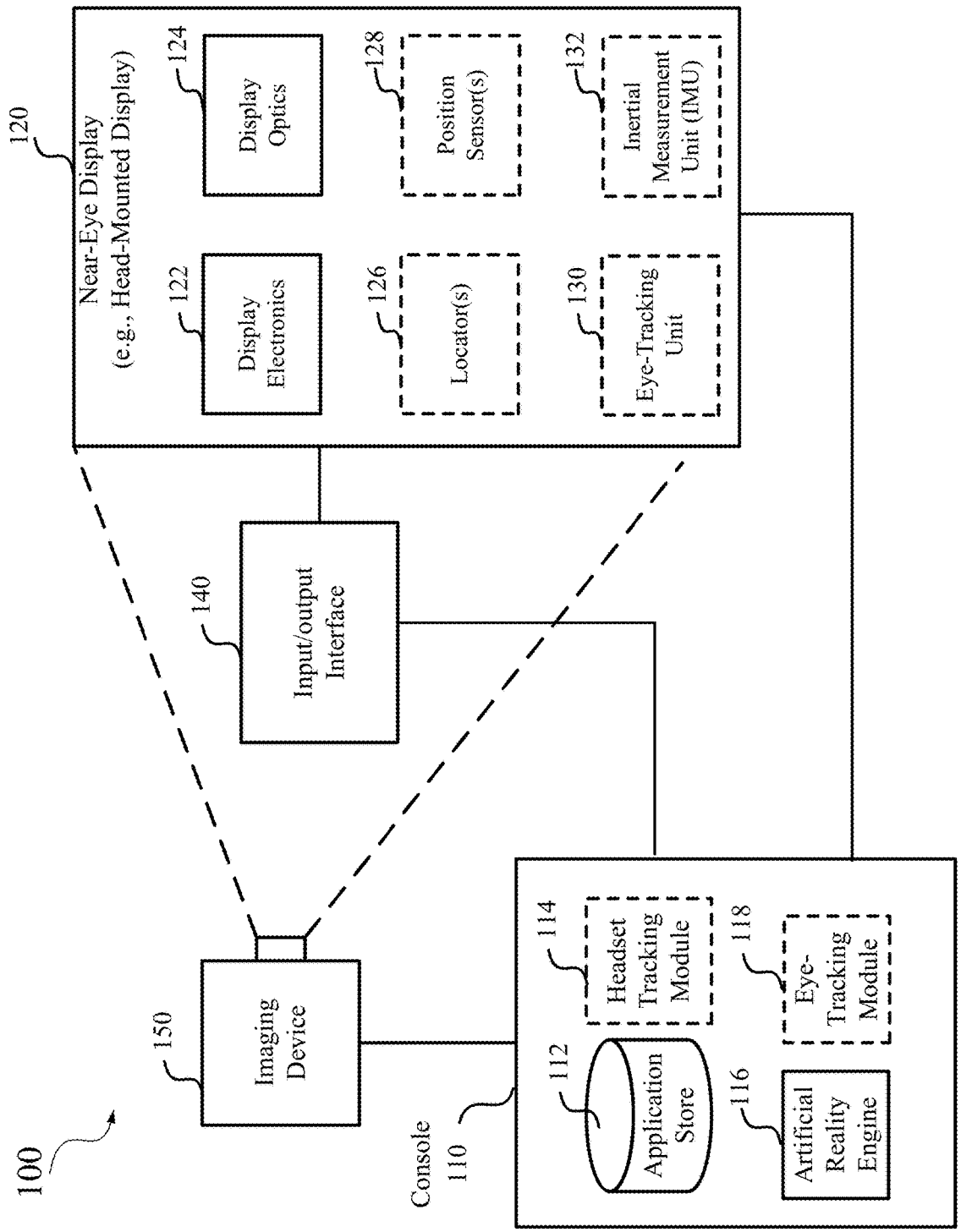
FIG. 1 is a simplified block diagram of an example of an artificial reality system environment including a near-eye display according to certain embodiments.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

This disclosure relates generally to sol-gel overcoating materials. More specifically, techniques disclosed herein relate to sol-gel materials including metal oxide stabilizers for stabilizing high-index metal oxides (e.g., $TiO_2$) and metal oxysulfates (e.g., $Ti-O-SO_4$) via in-situ production of carboxylate (and/or carbonate) groups to prevent interactions between the metal oxides and the environment and/or residual organics, thereby improving the transparency of the sol-gel overcoating layer that superconformally fills surface-relief structures. Various inventive embodiments are described herein, including devices, systems, methods, materials, processes, compositions, and the like.

An artificial reality system, such as a head-mounted display (HMD) or heads-up display (HUD) system, generally includes a near-eye display configured to present content to a user via an electronic or optic display that is within, for example, about 10-20 mm in front of the user's eyes. The near-eye display may be in the form of, for example, a headset or a pair of glasses. The near-eye display may display virtual objects or combine images of real objects with virtual objects, as in virtual reality (VR), augmented reality (AR), or mixed reality (MR) applications. For example, in an AR system, a user may view both images of virtual objects (e.g., computer-generated images (CGIs)) and the surrounding environment by, for example, seeing through transparent display glasses or lenses (often referred to as optical see-through).

One example of an optical see-through AR system may use a waveguide-based optical display, where light of projected images may be coupled into a waveguide (e.g., a transparent substrate), propagate within the waveguide (e.g., through total internal reflection), and be coupled out of the waveguide at multiple locations towards a user's eye. In some implementations, the light of the projected images may be coupled into or out of the waveguide using diffractive optical elements, such as gratings, which may be transparent to ambient light and thus may allow light from the surrounding environment to pass through a see-through region of the waveguide to reach the user's eye without being diffracted. In some implementations, a surface-relief grating that includes surface-relief structures formed on a substrate or in a grating material layer deposited on a substrate may be used to couple light into or out of a waveguide. An overcoat layer with a refractive index different from the refractive index of the surface-relief structures may be formed on the surface-relief grating to fill gaps in the surface-relief structures and protect the surface-relief structures. The overcoat layer may need to be conformal to the surfaces of the surface-relief structures, have no voids or air bubbles, have a refractive index much higher or lower than the refractive index of the surface-relief structures, and have low absorption to visible light. The overcoat layer may include dielectric or semiconductor materials, such as Hafnia, Titania, Tantalum oxide, Tungsten oxide, Zirconium oxide, Gallium sulfide, Gallium nitride, Gallium phosphide, silicon, or high-refractive index organic materials (e.g., resins).

Sol-gels are materials that may include a solution comprising an oxide precursor that may have been at least partially condensed into an extended network. Upon coating and thermal annealing of the sol-gel material, precursor ligands and solvents in the sol-gel material may be removed to fully condense the extended network into an oxide film. The condensation process may result in densification, and, in some circumstances, crystallization. Thus, when applied onto a substrate and annealed, sol-gels can be used to form high refractive index (RI) coating layers. Sol-gel coatings formed using some existing sol-gel materials may be able to achieve desired shape in two dimensions, but the thickness (the third dimension) of the sol-gel coating may not be easy to vary as desired (see, e.g., Barhoum et al., Chem. Mater., 2011, 23, 23, 5177-5184; Yan et al., Electrochimica Acta, 2015, 169, 73-81; and Lu et al., Nano Letters, 2002, 2, 3, 183-186). Therefore, sol-gel materials may typically be used to form conformal coatings that may track the topography of underlying substrates that have no small, recessed features, where the shapes of the substrates may be complex (e.g., flat, bent, tubular, etc.) but the substrates generally do not contain recessed features at micrometer or nanometer scale.

When the substrate has nano-sized or micro-sized recessed features, some sol-gel materials may be able to trace the outline or contour of the recessed features to form an overcoat layer on the recessed features, and it may be possible to fill the recessed features with unannealed sol-gel film if the thickness of the sol-gel coating is greater than the depth of the recessed features. However, upon annealing, the sol-gel material inside the nano-sized or micro-sized recessed features may shrink and collapse into particulates and create holes or other voiding. Therefore, most existing sol-gel materials may not be able to produce superconformal fill of recessed features at micrometer or nanometer scale, and thus are typically not used for superconformal coating of recessed features at micrometer or nanometer scale. As such, the application of sol-gel materials in diffractive gratings with nanosized, high aspect-ratio surface-relief features may be limited.

However, sol-gel materials may have some appealing properties. For example, sol-gels can generally be dispensed as solutions, and thus may offer improved processability as compared to high RI nanocomposites that may have higher viscosity and decreased material flow. Furthermore, since sol-gels may not need the incorporation of a resin matrix, and since the annealing can drive most or all organic and solvent components out of the oxide network, sol-gels may also offer the advantages of high RI coatings with markedly improved transparency to visible light, as compared to nanocomposites that include high RI nanoparticles dispersed in a resin, the transparency of which may degrade over time. Therefore, it may be desirable to develop improved sol-gel materials that may be used to form overcoat layers on surface-relief gratings.

Titanium oxide-based sol-gels are attractive candidates for high RI applications due to their ability to readily produce films with RI greater than about 1.7 at processing temperatures no greater than about 500° C. Titanium oxide-based sol-gels may generally be prepared using solutions including some organic components to achieve desired properties, such as printability and superconformal filling of underlying recessed features. For example, to be used as overcoating materials for surface-relief gratings with micro-sized or nano-sized recessed structures, the titanium oxide materials may need to be able to superconformally fill nanosized, high aspect-ratio recessed features, and may need to be compatible with selective deposition techniques that can deposit materials at specific regions with specific amounts, such as spin coating, spray coating, 3D printing, screen printing, or inkjet printing.

In addition, the structure of titanium oxide films prepared using sol-gels may need to be optimized to lower their absorption and increase the transparency. For example, the crystal structure (see, e.g., Luttrell et al., SCIENTIFIC REPORTS, 4 (2014) 4043) and/or the oxygen vacancies/Ti (III) in the oxide lattice (see, e.g., Zuo et al., Angew. Chem. Int. Ed., 2012, 51, 1-5; see also, Wu et al., Nano Energy, 24 (2016) 63-71) may contribute to increased absorption in the visible range of the light spectrum. Furthermore, titanium oxide materials may interact with organics, moisture, and oxygen, which may lead to further increase in absorption in the visible range. These interactions may be triggered via titanium oxide photoexcitation and/or may be thermally induced. The increase in absorption following these interactions may be due to, for example, oxidized organic species (see, e.g., Joost et al., Chem. Mater., 2018, 30, 24, 8968-8974; see also, Flores Tandy et al., Journal of Sol-Gel Science and Technology, volume 82, pages 51-58 (2017)), peroxide species (see, e.g., Wu et al., Nano Energy, 24 (2016) 63-71), reduced titanium oxide materials (see, e.g., Khan et al., Sci Rep, 8, 1723 (2018)), and/or the coordination of oxidized species to titanium oxide materials (see, e.g., Macyk et al., Coordination Chemistry Reviews, 254 (2010) 2687-2701). As a result, it is common for films prepared from titanium oxide-based sol-gel materials to show some levels of light absorption in the visible range of the light spectrum (see, e.g., Naceur et al., Curr. App. Phys., 12 (2012) 422-428; Sta et al., Journal of Sol-Gel Science and Technology, volume 72 (2014) 421-427; Hadi et al., IOP Conf Series: Journal of Physics: Conf Series, 1032 (2018) 012018; Ullah et al., Modern Physics Letters B, Vol. 32, No. 09, 1850076 (2018); and Liang et al., Materials, 2018, 11, 450). Furthermore, it is also common that the absorption of titanium oxide films may increase over time as the titanium oxide films are thermally excited or photo-excited, and/or as the titanium oxide films undergo redox interactions with their environment (see, e.g., Bharti et al., Scientific Reports, 6 (2016) 32355).

Therefore, in order for titanium oxide films to be used as optical coatings in applications that demand remarkably high transparency (e.g., with absorption less than 0.1%/100 nm), the structure of titanium oxide films prepared using sol-gels may need to be optimized to lower their absorption and increase the transparency. For example, it may be desirable to develop sol-gel materials that can prevent or protect the titanium oxide from interactions with its environment (e.g., residue organics) during film deposition, curing, and extended exposure to light and heat.

In some implementations, the sol-gel materials may be processed at high temperatures to eliminate or decompose the residue organics and minimize absorption. The annealing temperature for full densification and removal of the solvent and organics may depend on the chemical nature of the precursors used and the structure of the target oxide, and typically need to be higher than about 500° C. For example, full elimination of organics for $TiO_2$ films made from monomeric precursors is observed at about 600° C. (see, e.g., Taherniya et al., Mater. Res. Express, 2019, 6, 016417; and Tanski et al., BULLETIN OF THE POLISH ACADEMY OF SCIENCES TECHNICAL SCIENCES, Vol. 66, No. 2, 2018 DOI: 10.24425/119069). If the annealing temperature is lower, the organics may not be fully removed and the film transparency may be negatively impacted (see, e.g., Blanco et al., Applied Surface Science, 2018, 439, 736-748; and Gareso et al., 2019 J. Phys.: Conf. Ser., 1242 012037). However, annealing or other processing at high temperatures may not be compatible with other materials used in the optical devices, since many materials (e.g., polymers) that may be included in an optical device may degrade at temperatures greater than about 300° C. Therefore, new techniques to form titanium oxide films with high transparency at processing temperatures below about 300° C. may be needed.

In some implementations, the organics content of a sol-gel film may be lowered by pre-condensing the sol-gel material prior to coating, thereby lowering the potential interactions of the metal oxides with organics that may increase film absorption. However, pre-condensing the sol-gel material prior to coating may reduce the recessed feature filling capabilities of the sol-gel material. For example, sol-gels containing multicore precursors or extended titanium oxide networks can be used in the coating formulation, but the composition of these materials is typically unstable and tends to form nanoparticles in the solution over time (see, e.g., Sano et al., ACS Appl. Mater. Interfaces, 2020, 12, 40, 44743-44753). Furthermore, molecular oxide clusters may be unstable towards water and molecular oxygen, or may aggregate over time (see, e.g., Matthews et al., Chem. Commun., 2014, 50, 12815-12823; Coppens et al., Chem. Rev., 2014, 114, 9645-9661; and Rozes et al., Chem. Soc. Rev., 2011, 40, 1006-1030). When aggregates and/or nanoparticles are formed, a good-quality superconformal fill of the recessed features may be difficult without a support resin. Thus, the applicability of sol-gel materials including polyoxo clusters in industrial applications may be severely hampered. In some embodiments, a titanium oxysulfate-based sol-gel material may be used to achieve and retain recessed feature fill throughout the sol-gel annealing process. The sulfate ion may prevent the material from forming particles during the condensation process such that voiding may be prevented.

For selective deposition techniques, such as spray coating, 3D printing, and inkjet printing, high-boiling point (e.g., >140° C.) solvents may need to be used in the sol-gel materials because sol-gel materials without a high boiling point solvent may dry within the deposition tools (e.g., inside the inkjet printer nozzles). Sol-gel materials with high-boiling point solvents may need high annealing temperatures to remove the solvent. However, extended heat treatment of these materials with high-boiling point solvents may cause the absorption to be higher than 0.1%/100 nm in the visible range of the light spectrum.

According to certain embodiments disclosed herein, a sol-gel material may be used to superconformally fill surface-relief structures with nano-sized or micro-sized features having high aspect ratio at relative low temperatures (e.g., less than about 300° C.), while achieving a low absorption for visible light, a high refractive index, minimum or no voiding, a high stability over time and temperature, selective deposition capability, and a flat top surface on the surface-relief structures. The sol-gel materials may stabilize metal oxides such as titanium oxide or titanium oxysulfate via in-situ production of carboxylate (or carbonate) groups during sol-gel film curing, superconformally fill recessed features, and lower the absorption during deposition, processing, and extended exposure to light and/or heat. For example, the sol-gel materials disclosed herein may include hydrolytically unstable additives that may produce RCOO— groups in situ during processing, to prevent interactions of titanium oxide or titanium oxysulfate with the environment or residual organics that may otherwise increase the film absorption to be greater than about 0.1% in the visible range of the light spectrum, thereby leading to titanium oxide stabilization during processing and/or extended UV and heat exposure.

In some embodiments, the sol-gel material disclosed herein may include at least one titanium(IV) precursor, a source of sulfate or phosphate anions, and at least one additive or co-solvent of Formula 1 ($R^3OC(O)OR^4$) or Formula 2 ($R^5C(O)OR^6$). Formula 1 represents an organic carbonate, where $R^3$ and $R^4$ may be separate alkyl chains or parts of a same heterocyclic ring, such as a cyclic organic carbonate as in propylene carbonate (PC). In some embodiments, $R^3$ and $R^4$ may include alkyl or alkene groups that may optionally include carboxylate, alcohol, and/or ester functionalities and may optionally be catenated to form a heterocycle. Formula 2 represents an organic ester, where $R^5$ and $R^6$ are separate alkyl chains or parts of a same heterocyclic ring, such as a lactone as in gamma butyrolactone (GBL). In some embodiments, $R^5$ and $R^6$ may include alkyl or alkene groups that may optionally include carboxylate, alcohol, and/or ester functionalities and may optionally be catenated to form a heterocycle. The titanium(IV) precursor and sulfate or phosphate anions may be able to form an amorphous and continuous phase that may not segregate into particulates inside recessed features during the annealing process, and thus may be able to produce superconformal recessed feature filling without voiding. The additives according to Formula 1 and Formula 2 may stabilize the titanium oxide or titanium oxysulfate material and prevent it from undergoing interactions with other formulation components (e.g., organics) or its environment (e.g., oxygen and moisture), such that the absorption of the film may be less than about 0.1%/100 nm. In some embodiments, the solvent mixture of the overall formulation may include at least 40% by mass of organic solvents with a boiling point greater than about 140° C., such that the material can be selectively deposited onto a substrate via inkjet printing or other selective deposition techniques, without causing issues or damages to the deposition equipment, such as nozzle clogging due to premature solvent evaporation and sol-gel precipitation.

In one example, titanium(IV) oxysulfate may be used as the titanium(IV) precursor and the source of sulfate ions, and GBL and propylene carbonate (PC) may be used as the additives following Formula 1 and Formula 2. Both GBL and PC may be partially hydrolyzed in situ upon annealing, thereby generating carboxylate ligands that can stabilize the titanium oxide film against interactions with its environment that may otherwise produce oxidized organic byproducts, Ti(III) centers, or oxygen vacancies in the titanium oxide structure. As such, the addition of GBL and PC may lead to a film that is highly transparent in the visible spectrum and has an absorption rate less than about 0.1%/100 nm.

In some embodiments, other components such as acids, bases, peroxides, surfactants, and other solubilizing solvents (such as alcohols, glycols, and water) may optionally be added to the sol-gel material to tune the coating quality, uniformity, and optical properties of the material. In one example, the formulation may include nitric acid, propylene glycol methyl ether (PGME), and water.

The sol-gel materials disclosed herein can be applied onto a substrate including nano-sized surface-relief structures formed thereon or therein to achieve superconformal fill of the nano-sized surface-relief structures. For example, in some embodiments, a two-stage thermal densification of the film (e.g., first at or below about 100° C. and then at above 100° C.) and an optional UV curing between the two annealing processes may be performed, where the sol-gel material may be retained in the surface-relief structures without any voiding and the resultant coating may be highly transparent (e.g., with an absorption rate less than about 0.1%/100 nm).

In some embodiments, a process may include preparing a sol-gel solution that may include at least one titanium(IV) precursor, a source of sulfate ions, one or more solubilizing agents, and one or more stabilizer agents of Formula 1 and Formula 2 to prevent changes in film transparency; applying (e.g., via spin coating, dip coating, spray coating, inkjet printing, screen printing, or contact printing) the sol-gel solution onto a substrate including surface-relief structures formed hereon; and thermally annealing the substrate via at least two stages of thermal annealing at 2 different temperatures and optionally an additional UV curing step. In one example, a first annealing step at a temperature in the range of about 20-100° C. may be performed prior to performing a subsequent anneal step at a temperature in the range of about 200-300° C., and a UV curing step may optionally be applied between the two annealing steps. Once fully annealed, the film produced may have a refractive index between about 1.6 and about 1.9 or higher, and may be fully set such that it may not be removed from the substrate by washing with an organic solvent or any of the solvents used to form the coating. Superconformal and void-free filling of the surface-relief structures in the substrate may be achieved, while maintaining a high transparency (e.g., with an absorption rate less than about 0.1%/100 nm).

In the following description, for the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example" is not necessarily to be construed as preferred or advantageous over other embodiments or designs.

FIG. 1 is a simplified block diagram of an example of an artificial reality system environment 100 including a near-eye display 120 in accordance with certain embodiments. Artificial reality system environment 100 shown in FIG. 1 may include near-eye display 120, an optional external imaging device 150, and an optional input/output interface 140, each of which may be coupled to an optional console 110. While FIG. 1 shows an example of artificial reality system environment 100 including one near-eye display 120, one external imaging device 150, and one input/output interface 140, any number of these components may be included in artificial reality system environment 100, or any of the components may be omitted. For example, there may be multiple near-eye displays 120 monitored by one or more external imaging devices 150 in communication with console 110. In some configurations, artificial reality system environment 100 may not include external imaging device 150, optional input/output interface 140, and optional console 110. In alternative configurations, different or additional components may be included in artificial reality system environment 100.

Near-eye display 120 may be a head-mounted display that presents content to a user. Examples of content presented by near-eye display 120 include one or more of images, videos, audio, or any combination thereof. In some embodiments, audio may be presented via an external device (e.g., speakers and/or headphones) that receives audio information from near-eye display 120, console 110, or both, and presents audio data based on the audio information. Near-eye display 120 may include one or more rigid bodies, which may be rigidly or non-rigidly coupled to each other. A rigid coupling between rigid bodies may cause the coupled rigid bodies to act as a single rigid entity. A non-rigid coupling between rigid bodies may allow the rigid bodies to move relative to each other. In various embodiments, near-eye display 120 may be implemented in any suitable form-factor, including a pair of glasses. Some embodiments of near-eye display 120 are further described below with respect to FIGS. 2 and 3. Additionally, in various embodiments, the functionality described herein may be used in a headset that combines images of an environment external to near-eye display 120 and artificial reality content (e.g., computer-generated images). Therefore, near-eye display 120 may augment images of a physical, real-world environment external to near-eye display 120 with generated content (e.g., images, video, or sound) to present an augmented reality to a user.

In various embodiments, near-eye display 120 may include one or more of display electronics 122, display optics 124, and an eye-tracking unit 130. In some embodiments, near-eye display 120 may also include one or more locators 126, one or more position sensors 128, and an inertial measurement unit (IMU) 132. Near-eye display 120 may omit any of eye-tracking unit 130, locators 126, position sensors 128, and IMU 132, or include additional elements in various embodiments. Additionally, in some embodiments, near-eye display 120 may include elements combining the function of various elements described in conjunction with FIG. 1.

Display electronics 122 may display or facilitate the display of images to the user according to data received from, for example, console 110. In various embodiments, display electronics 122 may include one or more display panels, such as a liquid crystal display (LCD), an organic light emitting diode (OLED) display, an inorganic light emitting diode (ILED) display, a micro light emitting diode (µLED) display, an active-matrix OLED display (AMOLED), a transparent OLED display (TOLED), or some other display. For example, in one implementation of near-eye display 120, display electronics 122 may include a front TOLED panel, a rear display panel, and an optical component (e.g., an attenuator, polarizer, or diffractive or spectral film) between the front and rear display panels. Display electronics 122 may include pixels to emit light of a predominant color such as red, green, blue, white, or yellow. In some implementations, display electronics 122 may display a three-dimensional (3D) image through stereoscopic effects produced by two-dimensional panels to create a subjective perception of image depth. For example, display electronics 122 may include a left display and a right display positioned in front of a user's left eye and right eye, respectively. The left and right displays may present copies of an image shifted horizontally relative to each other to create a stereoscopic effect (i.e., a perception of image depth by a user viewing the image).

In certain embodiments, display optics 124 may display image content optically (e.g., using optical waveguides and couplers) or magnify image light received from display electronics 122, correct optical errors associated with the image light, and present the corrected image light to a user of near-eye display 120. In various embodiments, display optics 124 may include one or more optical elements, such as, for example, a substrate, optical waveguides, an aperture, a Fresnel lens, a convex lens, a concave lens, a filter, input/output couplers, or any other suitable optical elements that may affect image light emitted from display electronics 122. Display optics 124 may include a combination of different optical elements as well as mechanical couplings to maintain relative spacing and orientation of the optical elements in the combination. One or more optical elements in display optics 124 may have an optical coating, such as an antireflective coating, a reflective coating, a filtering coating, or a combination of different optical coatings.

Magnification of the image light by display optics 124 may allow display electronics 122 to be physically smaller, weigh less, and consume less power than larger displays. Additionally, magnification may increase a field of view of the displayed content. The amount of magnification of image light by display optics 124 may be changed by adjusting, adding, or removing optical elements from display optics 124. In some embodiments, display optics 124 may project displayed images to one or more image planes that may be further away from the user's eyes than near-eye display 120.

Display optics 124 may also be designed to correct one or more types of optical errors, such as two-dimensional optical errors, three-dimensional optical errors, or any combination thereof. Two-dimensional errors may include optical aberrations that occur in two dimensions. Example types of two-dimensional errors may include barrel distortion, pincushion distortion, longitudinal chromatic aberration, and transverse chromatic aberration. Three-dimensional errors may include optical errors that occur in three dimensions. Example types of three-dimensional errors may include spherical aberration, comatic aberration, field curvature, and astigmatism.

Locators 126 may be objects located in specific positions on near-eye display 120 relative to one another and relative to a reference point on near-eye display 120. In some implementations, console 110 may identify locators 126 in images captured by external imaging device 150 to determine the artificial reality headset's position, orientation, or both. A locator 126 may be an LED, a corner cube reflector, a reflective marker, a type of light source that contrasts with an environment in which near-eye display 120 operates, or any combination thereof. In embodiments where locators 126 are active components (e.g., LEDs or other types of light emitting devices), locators 126 may emit light in the visible band (e.g., about 380 nm to 750 nm), in the infrared (IR) band (e.g., about 750 nm to 1 mm), in the ultraviolet band (e.g., about 10 nm to about 380 nm), in another portion of the electromagnetic spectrum, or in any combination of portions of the electromagnetic spectrum.

External imaging device 150 may include one or more cameras, one or more video cameras, any other device capable of capturing images including one or more of locators 126, or any combination thereof. Additionally, external imaging device 150 may include one or more filters (e.g., to increase signal to noise ratio). External imaging device 150 may be configured to detect light emitted or reflected from locators 126 in a field of view of external imaging device 150. In embodiments where locators 126 include passive elements (e.g., retroreflectors), external imaging device 150 may include a light source that illuminates some or all of locators 126, which may retro-reflect the light to the light source in external imaging device 150. Slow calibration data may be communicated from external imaging device 150 to console 110, and external imaging device 150 may receive one or more calibration parameters from console 110 to adjust one or more imaging parameters (e.g., focal length, focus, frame rate, sensor temperature, shutter speed, or aperture).

Position sensors 128 may generate one or more measurement signals in response to motion of near-eye display 120. Examples of position sensors 128 may include accelerometers, gyroscopes, magnetometers, other motion-detecting or error-correcting sensors, or any combination thereof. For example, in some embodiments, position sensors 128 may include multiple accelerometers to measure translational motion (e.g., forward/back, up/down, or left/right) and multiple gyroscopes to measure rotational motion (e.g., pitch, yaw, or roll). In some embodiments, various position sensors may be oriented orthogonally to each other.

IMU 132 may be an electronic device that generates fast calibration data based on measurement signals received from one or more of position sensors 128. Position sensors 128 may be located external to IMU 132, internal to IMU 132, or any combination thereof. Based on the one or more measurement signals from one or more position sensors 128, IMU 132 may generate fast calibration data indicating an estimated position of near-eye display 120 relative to an initial position of near-eye display 120. For example, IMU 132 may integrate measurement signals received from accelerometers over time to estimate a velocity vector and integrate the velocity vector over time to determine an estimated position of a reference point on near-eye display 120. Alternatively, IMU 132 may provide the sampled measurement signals to console 110, which may determine the fast calibration data. While the reference point may generally be defined as a point in space, in various embodiments, the reference point may also be defined as a point within near-eye display 120 (e.g., a center of IMU 132).

Eye-tracking unit 130 may include one or more eye-tracking systems. Eye tracking may refer to determining an eye's position, including orientation and location of the eye, relative to near-eye display 120. An eye-tracking system may include an imaging system to image one or more eyes and may optionally include a light emitter, which may generate light that is directed to an eye such that light reflected by the eye may be captured by the imaging system. For example, eye-tracking unit 130 may include a non-coherent or coherent light source (e.g., a laser diode) emitting light in the visible spectrum or infrared spectrum, and a camera capturing the light reflected by the user's eye. As another example, eye-tracking unit 130 may capture reflected radio waves emitted by a miniature radar unit. Eye-tracking unit 130 may use low-power light emitters that emit light at frequencies and intensities that would not injure the eye or cause physical discomfort. Eye-tracking unit 130 may be arranged to increase contrast in images of an eye captured by eye-tracking unit 130 while reducing the overall power consumed by eye-tracking unit 130 (e.g., reducing power consumed by a light emitter and an imaging system included in eye-tracking unit 130). For example, in some implementations, eye-tracking unit 130 may consume less than 100 milliwatts of power.

Near-eye display 120 may use the orientation of the eye to, e.g., determine an inter-pupillary distance (IPD) of the user, determine gaze direction, introduce depth cues (e.g., blur image outside of the user's main line of sight), collect heuristics on the user interaction in the VR media (e.g., time spent on any particular subject, object, or frame as a function of exposed stimuli), some other functions that are based in part on the orientation of at least one of the user's eyes, or any combination thereof. Because the orientation may be determined for both eyes of the user, eye-tracking unit 130 may be able to determine where the user is looking. For example, determining a direction of a user's gaze may include determining a point of convergence based on the determined orientations of the user's left and right eyes. A point of convergence may be the point where the two foveal axes of the user's eyes intersect. The direction of the user's gaze may be the direction of a line passing through the point of convergence and the mid-point between the pupils of the user's eyes.

Input/output interface 140 may be a device that allows a user to send action requests to console 110. An action request may be a request to perform a particular action. For example, an action request may be to start or to end an application or to perform a particular action within the application. Input/output interface 140 may include one or more input devices. Example input devices may include a keyboard, a mouse, a game controller, a glove, a button, a touch screen, or any other suitable device for receiving action requests and communicating the received action requests to console 110. An action request received by the input/output interface 140 may be communicated to console 110, which may perform an action corresponding to the requested action. In some embodiments, input/output interface 140 may provide haptic feedback to the user in accordance with instructions received from console 110. For example, input/output interface 140 may provide haptic feedback when an action request is received, or when console 110 has performed a requested action and communicates instructions to input/output interface 140. In some embodiments, external imaging device 150 may be used to track input/output interface 140, such as tracking the location or position of a controller (which may include, for example, an IR light source) or a hand of the user to determine the motion of the user. In some embodiments, near-eye display 120 may include one or more imaging devices to track input/output interface 140, such as tracking the location or position of a controller or a hand of the user to determine the motion of the user.

Console 110 may provide content to near-eye display 120 for presentation to the user in accordance with information received from one or more of external imaging device 150, near-eye display 120, and input/output interface 140. In the example shown in FIG. 1, console 110 may include an application store 112, a headset tracking module 114, an artificial reality engine 116, and an eye-tracking module 118. Some embodiments of console 110 may include different or additional modules than those described in conjunction with FIG. 1. Functions further described below may be distributed among components of console 110 in a different manner than is described here.

In some embodiments, console 110 may include a processor and a non-transitory computer-readable storage medium storing instructions executable by the processor. The processor may include multiple processing units executing instructions in parallel. The non-transitory computer-readable storage medium may be any memory, such as a hard disk drive, a removable memory, or a solid-state drive (e.g., flash memory or dynamic random access memory (DRAM)). In various embodiments, the modules of console 110 described in conjunction with FIG. 1 may be encoded as instructions in the non-transitory computer-readable storage medium that, when executed by the processor, cause the processor to perform the functions further described below.

Application store 112 may store one or more applications for execution by console 110. An application may include a group of instructions that, when executed by a processor, generates content for presentation to the user. Content generated by an application may be in response to inputs received from the user via movement of the user's eyes or inputs received from the input/output interface 140. Examples of the applications may include gaming applications, conferencing applications, video playback application, or other suitable applications.

Headset tracking module 114 may track movements of near-eye display 120 using slow calibration information from external imaging device 150. For example, headset tracking module 114 may determine positions of a reference point of near-eye display 120 using observed locators from the slow calibration information and a model of near-eye display 120. Headset tracking module 114 may also determine positions of a reference point of near-eye display 120 using position information from the fast calibration information. Additionally, in some embodiments, headset tracking module 114 may use portions of the fast calibration information, the slow calibration information, or any combination thereof, to predict a future location of near-eye display 120. Headset tracking module 114 may provide the estimated or predicted future position of near-eye display 120 to artificial reality engine 116.

Artificial reality engine 116 may execute applications within artificial reality system environment 100 and receive position information of near-eye display 120, acceleration information of near-eye display 120, velocity information of near-eye display 120, predicted future positions of near-eye display 120, or any combination thereof from headset tracking module 114. Artificial reality engine 116 may also receive estimated eye position and orientation information from eye-tracking module 118. Based on the received information, artificial reality engine 116 may determine content to provide to near-eye display 120 for presentation to the user. For example, if the received information indicates that the user has looked to the left, artificial reality engine 116 may generate content for near-eye display 120 that mirrors the user's eye movement in a virtual environment. Additionally, artificial reality engine 116 may perform an action within an application executing on console 110 in response to an action request received from input/output interface 140, and provide feedback to the user indicating that the action has been performed. The feedback may be visual or audible feedback via near-eye display 120 or haptic feedback via input/output interface 140.

Eye-tracking module 118 may receive eye-tracking data from eye-tracking unit 130 and determine the position of the user's eye based on the eye tracking data. The position of the eye may include an eye's orientation, location, or both relative to near-eye display 120 or any element thereof. Because the eye's axes of rotation change as a function of the eye's location in its socket, determining the eye's location in its socket may allow eye-tracking module 118 to determine the eye's orientation more accurately.

Figure 2:
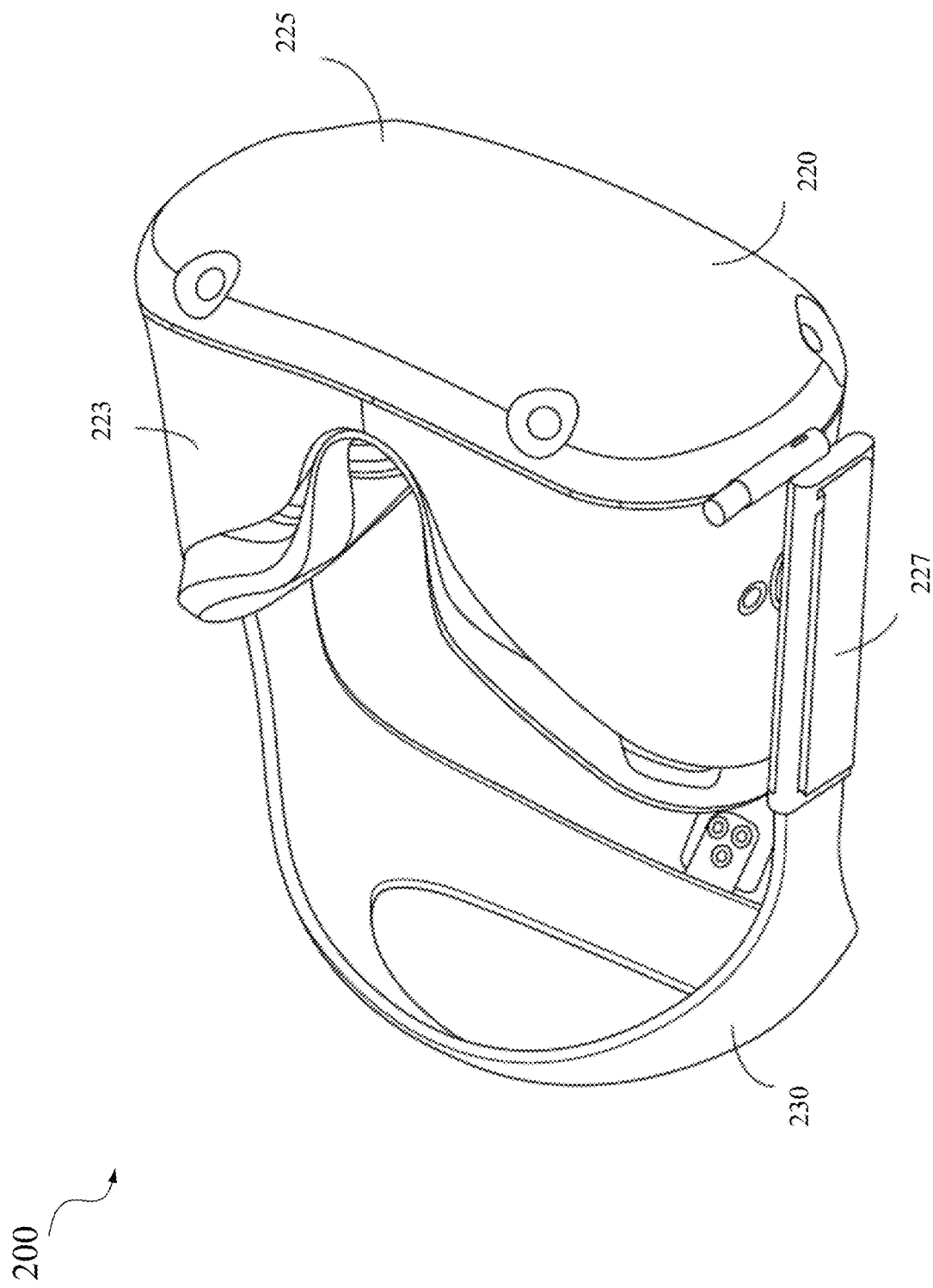
FIG. 2 is a perspective view of an example of a near-eye display in the form of a head-mounted display (HMD) device for implementing some of the examples disclosed herein.

FIG. 2 is a perspective view of an example of a near-eye display in the form of an HMD device 200 for implementing some of the examples disclosed herein. HMD device 200 may be a part of, e.g., a VR system, an AR system, an MR system, or any combination thereof. HMD device 200 may include a body 220 and a head strap 230. FIG. 2 shows a bottom side 223, a front side 225, and a left side 227 of body 220 in the perspective view. Head strap 230 may have an adjustable or extendible length. There may be a sufficient space between body 220 and head strap 230 of HMD device 200 for allowing a user to mount HMD device 200 onto the user's head. In various embodiments, HMD device 200 may include additional, fewer, or different components. For example, in some embodiments, HMD device 200 may include eyeglass temples and temple tips as shown in, for example, FIG. 3 below, rather than head strap 230.

HMD device 200 may present to a user media including virtual and/or augmented views of a physical, real-world environment with computer-generated elements. Examples of the media presented by HMD device 200 may include images (e.g., two-dimensional (2D) or three-dimensional (3D) images), videos (e.g., 2D or 3D videos), audio, or any combination thereof.

The images and videos may be presented to each eye of the user by one or more display assemblies (not shown in FIG. 2) enclosed in body 220 of HMD device 200. In various embodiments, the one or more display assemblies may include a single electronic display panel or multiple electronic display panels (e.g., one display panel for each eye of the user). Examples of the electronic display panel(s) may include, for example, an LCD, an OLED display, an ILED display, a μLED display, an AMOLED, a TOLED, some other display, or any combination thereof. HMD device 200 may include two eyebox regions.

In some implementations, HMD device 200 may include various sensors (not shown), such as depth sensors, motion sensors, position sensors, and eye tracking sensors. Some of these sensors may use a structured light pattern for sensing. In some implementations, HMD device 200 may include an input/output interface for communicating with a console. In some implementations, HMD device 200 may include a virtual reality engine (not shown) that can execute applications within HMD device 200 and receive depth information, position information, acceleration information, velocity information, predicted future positions, or any combination thereof of HMD device 200 from the various sensors. In some implementations, the information received by the virtual reality engine may be used for producing a signal (e.g., display instructions) to the one or more display assemblies. In some implementations, HMD device 200 may include locators (not shown, such as locators 126) located in fixed positions on body 220 relative to one another and relative to a reference point. Each of the locators may emit light that is detectable by an external imaging device.

Figure 3:
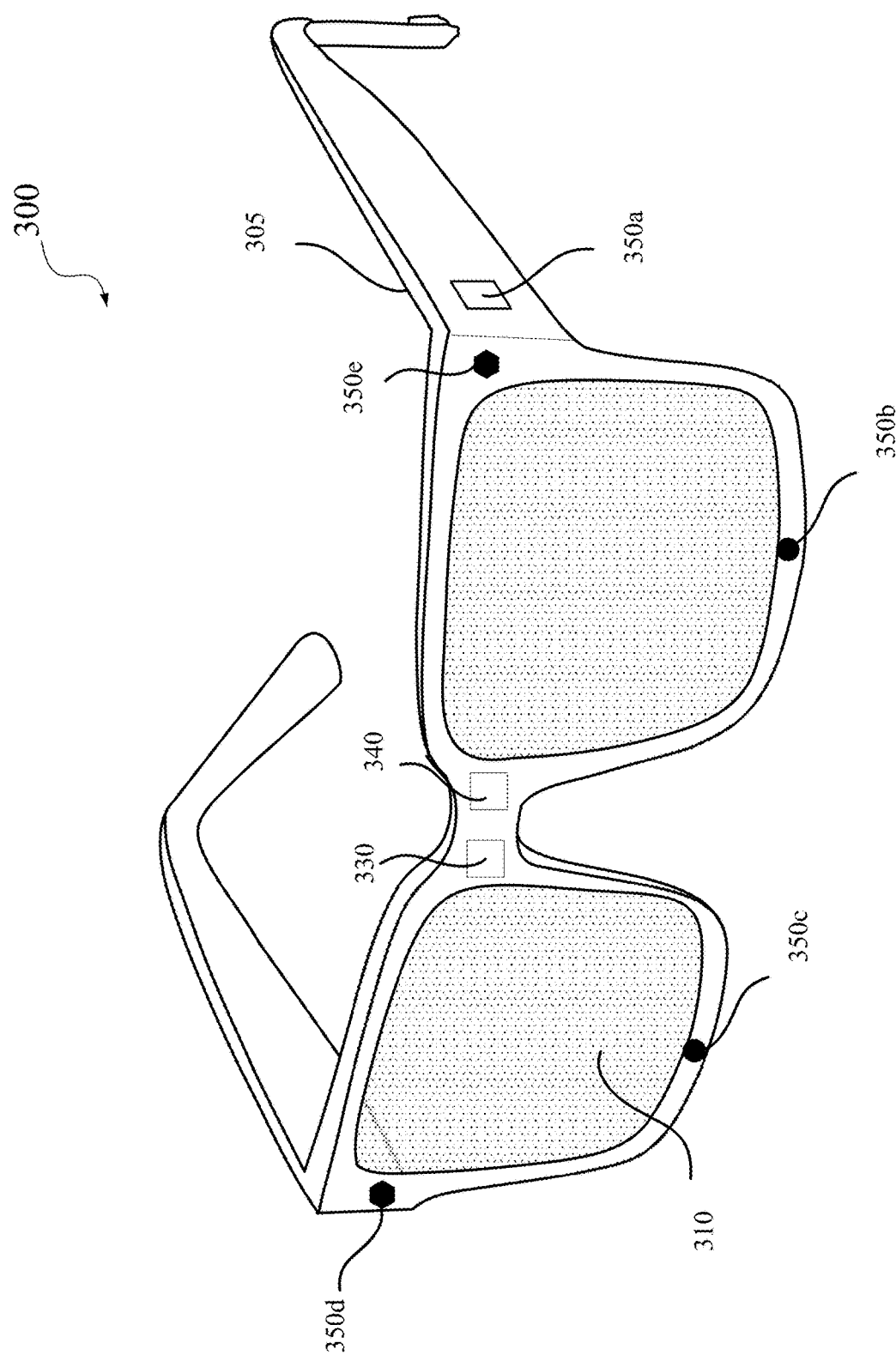
FIG. 3 is a perspective view of an example of a near-eye display in the form of a pair of glasses for implementing some of the examples disclosed herein.

FIG. 3 is a perspective view of an example of a near-eye display 300 in the form of a pair of glasses for implementing some of the examples disclosed herein. Near-eye display 300 may be a specific implementation of near-eye display 120 of FIG. 1, and may be configured to operate as a virtual reality display, an augmented reality display, and/or a mixed reality display. Near-eye display 300 may include a frame 305 and a display 310. Display 310 may be configured to present content to a user. In some embodiments, display 310 may include display electronics and/or display optics. For example, as described above with respect to near-eye display 120 of FIG. 1, display 310 may include an LCD display panel, an LED display panel, or an optical display panel (e.g., a waveguide display assembly).

Near-eye display 300 may further include various sensors 350a, 350b, 350c, 350d, and 350e on or within frame 305. In some embodiments, sensors 350a-350e may include one or more depth sensors, motion sensors, position sensors, inertial sensors, or ambient light sensors. In some embodiments, sensors 350a-350e may include one or more image sensors configured to generate image data representing different fields of views in different directions. In some embodiments, sensors 350a-350e may be used as input devices to control or influence the displayed content of near-eye display 300, and/or to provide an interactive VR/AR/MR experience to a user of near-eye display 300. In some embodiments, sensors 350a-350e may also be used for stereoscopic imaging.

In some embodiments, near-eye display 300 may further include one or more illuminators 330 to project light into the physical environment. The projected light may be associated with different frequency bands (e.g., visible light, infra-red light, or ultra-violet light), and may serve various purposes. For example, illuminator(s) 330 may project light in a dark environment (or in an environment with low intensity of infra-red light, ultra-violet light, etc.) to assist sensors 350a-350e in capturing images of different objects within the dark environment. In some embodiments, illuminator(s) 330 may be used to project certain light patterns onto the objects within the environment. In some embodiments, illuminator(s) 330 may be used as locators, such as locators 126 described above with respect to FIG. 1.

In some embodiments, near-eye display 300 may also include a high-resolution camera 340. Camera 340 may capture images of the physical environment in the field of view. The captured images may be processed, for example, by a virtual reality engine (e.g., artificial reality engine 116 of FIG. 1) to add virtual objects to the captured images or modify physical objects in the captured images, and the processed images may be displayed to the user by display 310 for AR or MR applications.

FIG. 4 illustrates an example of an optical see-through augmented reality system 400 including a waveguide display according to certain embodiments. Augmented reality system 400 may include a projector 410 and a combiner 415. Projector 410 may include a light source or image source 412 and projector optics 414. In some embodiments, light source or image source 412 may include one or more micro-LED devices described above. In some embodiments, image source 412 may include a plurality of pixels that displays virtual objects, such as an LCD display panel or an LED display panel. In some embodiments, image source 412 may include a light source that generates coherent or partially coherent light. For example, image source 412 may include a laser diode, a vertical cavity surface emitting laser, an LED, and/or a micro-LED described above. In some embodiments, image source 412 may include a plurality of light sources (e.g., an array of micro-LEDs described above), each emitting a monochromatic image light corresponding to a primary color (e.g., red, green, or blue). In some embodiments, image source 412 may include three two-dimensional arrays of micro-LEDs, where each two-dimensional array of micro-LEDs may include micro-LEDs configured to emit light of a primary color (e.g., red, green, or blue). In some embodiments, image source 412 may include an optical pattern generator, such as a spatial light modulator. Projector optics 414 may include one or more optical components that can condition the light from image source 412, such as expanding, collimating, scanning, or projecting light from image source 412 to combiner 415. The one or more optical components may include, for example, one or more lenses, liquid lenses, mirrors, apertures, and/or gratings. For example, in some embodiments, image source 412 may include one or more one-dimensional arrays or elongated two-dimensional arrays of micro-LEDs, and projector optics 414 may include one or more one-dimensional scanners (e.g., micro-mirrors or prisms) configured to scan the one-dimensional arrays or elongated two-dimensional arrays of micro-LEDs to generate image frames. In some embodiments, projector optics 414 may include a liquid lens (e.g., a liquid crystal lens) with a plurality of electrodes that allows scanning of the light from image source 412.

Combiner 415 may include an input coupler 430 for coupling light from projector 410 into a substrate 420 of combiner 415. Input coupler 430 may include a volume holographic grating, a diffractive optical element (DOE) (e.g., a surface-relief grating), a slanted surface of substrate 420, or a refractive coupler (e.g., a wedge or a prism). For example, input coupler 430 may include a reflective volume Bragg grating or a transmissive volume Bragg grating. Input coupler 430 may have a coupling efficiency of greater than 30%, 50%, 75%, 90%, or higher for visible light. Light coupled into substrate 420 may propagate within substrate 420 through, for example, total internal reflection (TIR). Substrate 420 may be in the form of a lens of a pair of eyeglasses. Substrate 420 may have a flat or a curved surface, and may include one or more types of dielectric or semiconductor materials, such as glass, quartz, plastic, polymer, poly(methyl methacrylate) (PMMA), crystal, silicon, SiN, silicon carbide, ceramic, or the like. A thickness of the substrate may range from, for example, less than about 1 mm to about 10 mm or more. Substrate 420 may be transparent to visible light.

Substrate 420 may include or may be coupled to a plurality of output couplers 440, each configured to extract at least a portion of the light guided by and propagating within substrate 420 from substrate 420, and direct extracted light 460 to an eyebox 495 where an eye 490 of the user of augmented reality system 400 may be located when augmented reality system 400 is in use. The plurality of output couplers 440 may replicate the exit pupil to increase the size of eyebox 495 such that the displayed image is visible in a larger area. As input coupler 430, output couplers 440 may include grating couplers (e.g., volume holographic gratings or surface-relief gratings), other diffraction optical elements, or prisms. For example, output couplers 440 may include reflective volume Bragg gratings or transmissive volume Bragg gratings. Output couplers 440 may have different coupling (e.g., diffraction) efficiencies at different locations. Substrate 420 may also allow light 450 from the environment in front of combiner 415 to pass through with little or no loss. Output couplers 440 may also allow light 450 to pass through with little loss. For example, in some implementations, output couplers 440 may have a very low diffraction efficiency for light 450 such that light 450 may be refracted or otherwise pass through output couplers 440 with little loss, and thus may have a higher intensity than extracted light 460. In some implementations, output couplers 440 may have a high diffraction efficiency for light 450 and may diffract light 450 in certain desired directions (i.e., diffraction angles) with little loss. As a result, the user may be able to view combined images of the environment in front of combiner 415 and images of virtual objects projected by projector 410.

Figure 5B:
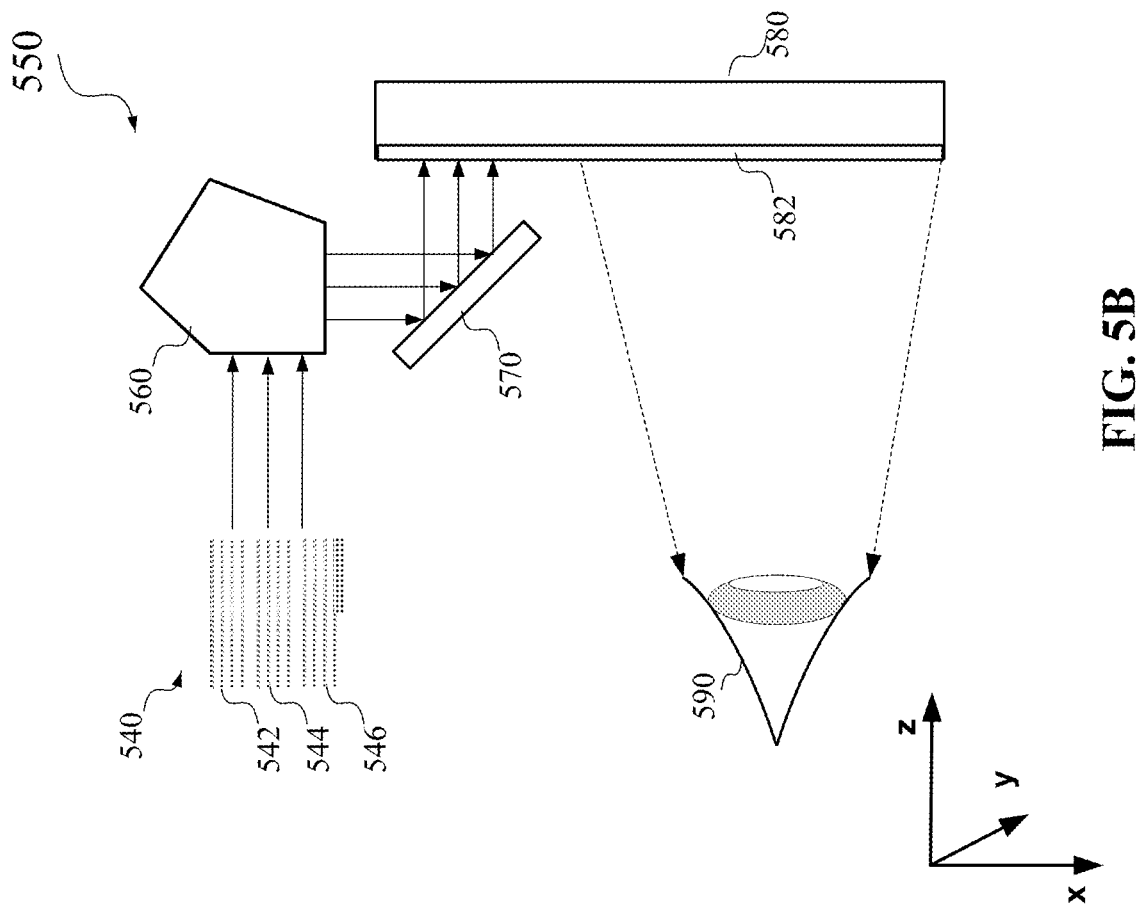
FIG. 5B illustrates an example of a near-eye display device including a waveguide display according to certain embodiments.
Figure 5A:
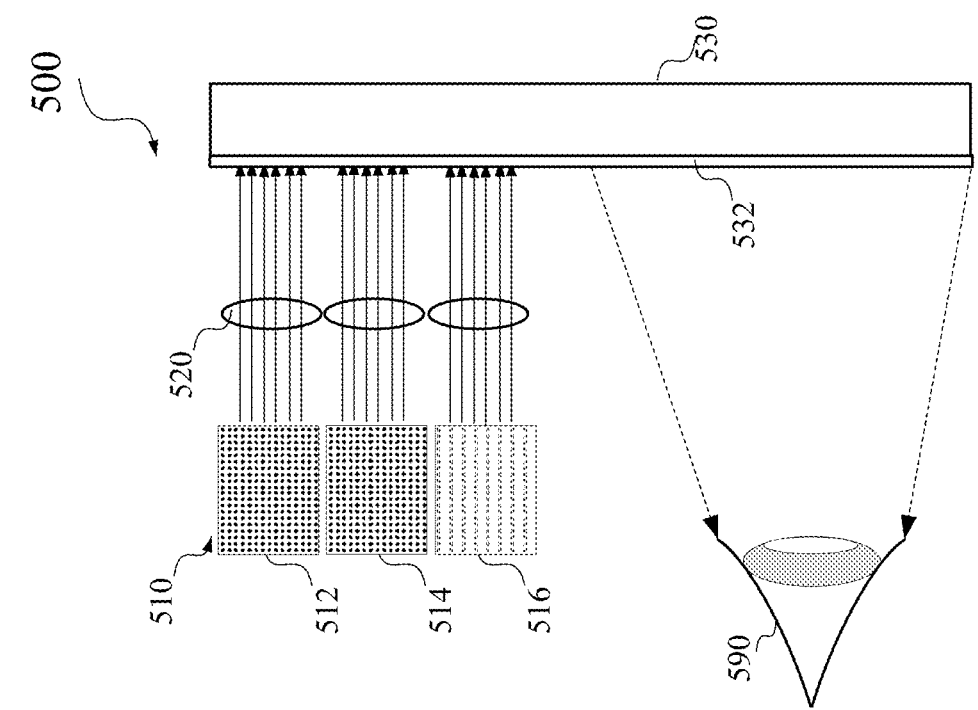
FIG. 5A illustrates an example of a near-eye display device including a waveguide display according to certain embodiments.

FIG. 5A illustrates an example of a near-eye display (NED) device 500 including a waveguide display 530 according to certain embodiments. NED device 500 may be an example of near-eye display 120, augmented reality system 400, or another type of display device. NED device 500 may include a light source 510, projection optics 520, and waveguide display 530. Light source 510 may include multiple panels of light emitters for different colors, such as a panel of red light emitters 512, a panel of green light emitters 514, and a panel of blue light emitters 516. The red light emitters 512 are organized into an array; the green light emitters 514 are organized into an array; and the blue light emitters 516 are organized into an array. The dimensions and pitches of light emitters in light source 510 may be small. For example, each light emitter may have a diameter less than 2 μm (e.g., about 1.2 μm) and the pitch may be less than 2 μm (e.g., about 1.5 μm). As such, the number of light emitters in each red light emitters 512, green light emitters 514, and blue light emitters 516 can be equal to or greater than the number of pixels in a display image, such as 960×720, 1280×720, 1440×1080, 1920×1080, 2160×1080, or 2560×1080 pixels. Thus, a display image may be generated simultaneously by light source 510. A scanning element may not be used in NED device 500.

Before reaching waveguide display 530, the light emitted by light source 510 may be conditioned by projection optics 520, which may include a lens array. Projection optics 520 may collimate or focus the light emitted by light source 510 to waveguide display 530, which may include a coupler 532 for coupling the light emitted by light source 510 into waveguide display 530. The light coupled into waveguide display 530 may propagate within waveguide display 530 through, for example, total internal reflection as described above with respect to FIG. 4. Coupler 532 may also couple portions of the light propagating within waveguide display 530 out of waveguide display 530 and towards user's eye 590.

FIG. 5B illustrates an example of a near-eye display (NED) device 550 including a waveguide display 580 according to certain embodiments. In some embodiments, NED device 550 may use a scanning mirror 570 to project light from a light source 540 to an image field where a user's eye 590 may be located. NED device 550 may be an example of near-eye display 120, augmented reality system 400, or another type of display device. Light source 540 may include one or more rows or one or more columns of light emitters of different colors, such as multiple rows of red light emitters 542, multiple rows of green light emitters 544, and multiple rows of blue light emitters 546. For example, red light emitters 542, green light emitters 544, and blue light emitters 546 may each include N rows, each row including, for example, 2560 light emitters (pixels). The red light emitters 542 are organized into an array; the green light emitters 544 are organized into an array; and the blue light emitters 546 are organized into an array. In some embodiments, light source 540 may include a single line of light emitters for each color. In some embodiments, light source 540 may include multiple columns of light emitters for each of red, green, and blue colors, where each column may include, for example, 1080 light emitters. In some embodiments, the dimensions and/or pitches of the light emitters in light source 540 may be relatively large (e.g., about 3-5 μm) and thus light source 540 may not include sufficient light emitters for simultaneously generating a full display image. For example, the number of light emitters for a single color may be fewer than the number of pixels (e.g., 2560×1080 pixels) in a display image. The light emitted by light source 540 may be a set of collimated or diverging beams of light.

Before reaching scanning mirror 570, the light emitted by light source 540 may be conditioned by various optical devices, such as collimating lenses or a freeform optical element 560. Freeform optical element 560 may include, for example, a multi-facet prism or another light folding element that may direct the light emitted by light source 540 towards scanning mirror 570, such as changing the propagation direction of the light emitted by light source 540 by, for example, about 900 or larger. In some embodiments, freeform optical element 560 may be rotatable to scan the light. Scanning mirror 570 and/or freeform optical element 560 may reflect and project the light emitted by light source 540 to waveguide display 580, which may include a coupler 582 for coupling the light emitted by light source 540 into waveguide display 580. The light coupled into waveguide display 580 may propagate within waveguide display 580 through, for example, total internal reflection as described above with respect to FIG. 4. Coupler 582 may also couple portions of the light propagating within waveguide display 580 out of waveguide display 580 and towards user's eye 590.

Scanning mirror 570 may include a microelectromechanical system (MEMS) mirror or any other suitable mirrors. Scanning mirror 570 may rotate to scan in one or two dimensions. As scanning mirror 570 rotates, the light emitted by light source 540 may be directed to a different area of waveguide display 580 such that a full display image may be projected onto waveguide display 580 and directed to user's eye 590 by waveguide display 580 in each scanning cycle. For example, in embodiments where light source 540 includes light emitters for all pixels in one or more rows or columns, scanning mirror 570 may be rotated in the column or row direction (e.g., x or y direction) to scan an image. In embodiments where light source 540 includes light emitters for some but not all pixels in one or more rows or columns, scanning mirror 570 may be rotated in both the row and column directions (e.g., both x and y directions) to project a display image (e.g., using a raster-type scanning pattern).

NED device 550 may operate in predefined display periods. A display period (e.g., display cycle) may refer to a duration of time in which a full image is scanned or projected. For example, a display period may be a reciprocal of the desired frame rate. In NED device 550 that includes scanning mirror 570, the display period may also be referred to as a scanning period or scanning cycle. The light generation by light source 540 may be synchronized with the rotation of scanning mirror 570. For example, each scanning cycle may include multiple scanning steps, where light source 540 may generate a different light pattern in each respective scanning step.

In each scanning cycle, as scanning mirror 570 rotates, a display image may be projected onto waveguide display 580 and user's eye 590. The actual color value and light intensity (e.g., brightness) of a given pixel location of the display image may be an average of the light beams of the three colors (e.g., red, green, and blue) illuminating the pixel location during the scanning period. After completing a scanning period, scanning mirror 570 may revert back to the initial position to project light for the first few rows of the next display image or may rotate in a reverse direction or scan pattern to project light for the next display image, where a new set of driving signals may be fed to light source 540. The same process may be repeated as scanning mirror 570 rotates in each scanning cycle. As such, different images may be projected to user's eye 590 in different scanning cycles.

Figure 6:
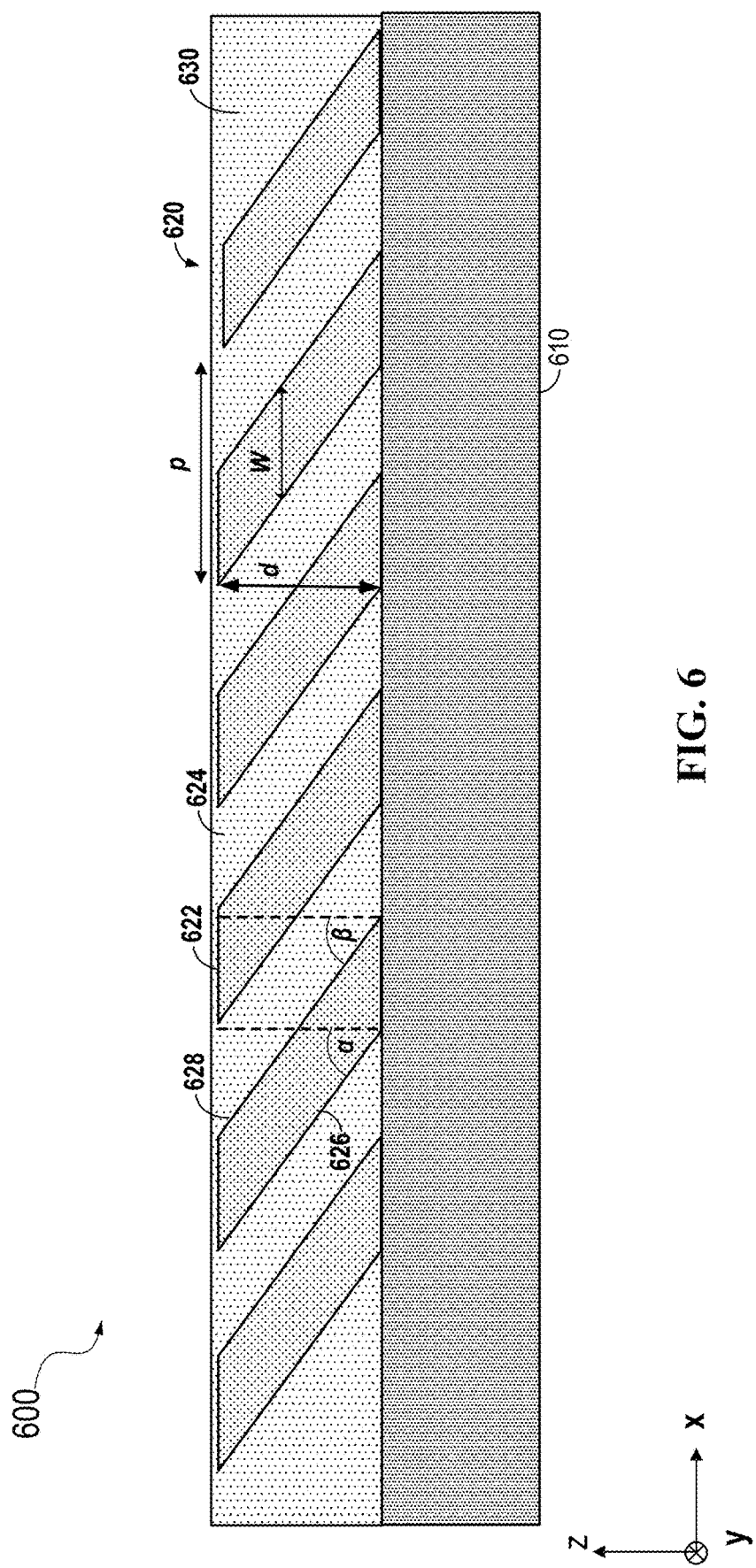
FIG. 6 illustrates an example of a slanted grating in a waveguide display according to certain embodiments.

FIG. 6 illustrates an example of a slanted grating 620 in a waveguide display 600 according to certain embodiments. Slanted grating 620 may be an example of input coupler 430, output couplers 440, coupler 532, or coupler 582. Slanted grating 620 may be formed on a waveguide 610, such as substrate 420. Slanted grating 620 may act as a grating coupler for couple light into or out of waveguide 610. In some embodiments, slanted grating 620 may include a one-dimensional periodic structure with a period p. For example, slanted grating 620 may include a plurality of ridges 622 and grooves 624 between ridges 622. Each period of slanted grating 620 may include a ridge 622 and a groove 624, which may be an air gap or a region filled with a material with a refractive index $n_{g2}$. The ratio between the width d of a ridge 622 and the grating period p may be referred to as duty cycle. Slanted grating 620 may have a duty cycle ranging, for example, from about 10% to about 90% or greater. In some embodiments, the duty cycle may vary from period to period. In some embodiments, the period p of the slanted grating may vary from one area to another on slanted grating 620, or may vary from one period to another (i.e., chirped) on slanted grating 620. In some embodiments, the heights of ridges 622 or the depths of grooves 624 may vary from one area to another on slanted grating 620, or may vary from one period to another on slanted grating 620. In some embodiments, slanted grating 620 may include a two-dimensional grating. In some embodiments, the period p, the duty cycle, the heights of ridges 622, and/or the depths of grooves 624 of slanted grating 620 may vary along the x direction, the y direction, or both.

Ridges 622 may be made of a material with a refractive index of $n_{g1}$, such as silicon containing materials (e.g., $SiO_2$, $Si_3N_4$, SiC, $SiO_xN_y$, or amorphous silicon), organic materials (e.g., spin on carbon (SOC) or amorphous carbon layer (ACL) or diamond like carbon (DLC)), or inorganic metal oxide layers (e.g., $TiO_x$, $AlO_x$, $TaO_x$, or $HfO_x$). Each ridge 622 may include a leading edge 626 with a slant angle α and a trailing edge 628 with a slant angle β. In some embodiments, leading edge 626 and training edge 628 of each ridge 622 may be parallel to each other. In other words, slant angle α is approximately equal to slant angle β. In some embodiments, slant angle α may be different from slant angle β. In some embodiments, slant angle α may be approximately equal to slant angle β. For example, the difference between slant angle α and slant angle β may be less than 20%, 10%, 5%, 1%, or less. In some embodiments, slant angle α and slant angle R may range from, for example, about 30° or less to about 60% or larger.

In some implementations, grooves 624 between the ridges 622 may be over-coated or filled with an overcoat layer 630. Overcoat layer 630 may include a material having a refractive index $n_{g2}$ higher or lower than the refractive index of the material of ridges 622. For example, in some embodiments, a high refractive index material, such as Hafnia, Titania, Tantalum oxide, Tungsten oxide, Zirconium oxide, Gallium sulfide, Gallium nitride, Gallium phosphide, silicon, sol-gels, a high refractive index polymer, or a combination thereof, may be used to fill grooves 624. In some embodiments, a low refractive index material, such as silicon oxide, alumina, porous silica, or fluorinated low index monomer (or polymer), may be used to fill grooves 624. As a result, the difference between the refractive index of the ridges and the refractive index of the grooves may be greater than 0.1, 0.2, 0.3, 0.5, 1.0, or higher. In some embodiments, the top surface of overcoat layer 630 may align with the top surfaces of ridges 622. In some embodiments, the top surface of overcoat layer 630 may be above the top surfaces of ridges 622.

Sol-gels are materials that may include a solution comprising an oxide precursor that may have been at least partially condensed into an extended network. Upon coating and thermal annealing of the sol-gel material, precursor ligands and solvents in the sol-gel material may be removed to fully condense the extended network into an oxide film. The condensation process may result in densification, and, in some circumstances, crystallization. Thus, when applied onto a substrate and annealed, sol-gels can be used to form high-refractive index (RI) coating layers. Sol-gel coatings made using some existing sol-gel materials may be able to achieve desired shape in two dimensions, but the thickness (the third dimension) of the sol-gel coatings may not be easy to vary as desired. Therefore, sol-gel materials may typically be used to form conformal coatings that may track the topography of underlying substrates that have no small, recessed features, where the shapes of the substrates may be complex (e.g., flat, bent, tubular, etc.) but the substrates generally do not contain recessed features at nanometer scale.

When the substrate has nano-sized or micro-sized recessed features, some sol-gel materials may be able to form an overcoat layer on the recessed features, and it may be possible to fill the recessed features with unannealed sol-gel film if the thickness of the sol-gel coating is greater than the depth of the recessed features. However, upon annealing, the sol-gel material inside the nano-sized or micro-sized recessed features may shrink and collapse into particulates and create holes or other voiding. Therefore, most existing sol-gel materials may not be able to produce superconformal fill of nano-sized recessed features, and thus are typically not used for superconformal coating of nano-sized recessed features. As such, the application of sol-gel materials in diffractive gratings with nanosized, high aspect-ratio surface-relief features may be limited.

However, sol-gel materials may be dispensed as solutions, and thus may offer improved processability as compared to high RI nanocomposites that may have higher viscosity and decreased material flow. Furthermore, since sol-gels may not need the incorporation of a resin matrix, and since the annealing can drive most or all organic and solvent components out of the oxide network, sol-gels may also offer the advantages of high RI coatings with markedly improved transparency to visible light, as compared to nanocomposites that include high RI nanoparticles dispersed in a resin, the transparency of which may degrade over time due to interactions of metal oxides and organic components. Therefore, it may be desirable to develop improved sol-gel materials that may be used to form overcoat layers on the surface-relief gratings with nano-sized recessed features.

Titanium oxide-based sol-gels are attractive candidates for high RI applications due to their ability to readily produce films with RI greater than about 1.7 at processing temperatures no greater than about 500° C. Titanium oxide sol-gels may generally be prepared from solutions including some organic components to achieve desired properties, such as printability and superconformal filling of underlying recessed features. For example, to be used as overcoating materials for surface-relief gratings with micro-sized or nano-sized recessed structures, the titanium oxide materials may need to be able to superconformally fill nanosized, high-aspect-ratio recessed features, and may need to be compatible with selective deposition techniques that can deposit materials at specific regions with specific amounts, such as spin coating, spray coating, 3D printing, screen printing, or inkjet printing.

However, as described above, the crystal structure and/or the oxygen vacancies/Ti(III) in titanium oxide lattice may contribute to increased absorption in the visible range of the light spectrum. Furthermore, titanium oxide may interact with moisture, oxygen, and organic components in the overcoat layer formed using titanium oxide-based sol-gel materials, which may lead to further increase in absorption in the visible range by the overcoat layer. These interactions may be triggered via titanium oxide photoexcitation and/or may be thermally induced. The increase in absorption following these interactions may be due to, for example, oxidized organic species, peroxide species, reduced titanium oxide materials, and/or the coordination of oxidized species to titanium oxide materials. As a result, it is common for films prepared from titanium oxide-based sol-gel materials to show some levels of light absorption in the visible range of the light spectrum. Furthermore, it is also common that the absorption of titanium oxide films may increase over time as the titanium oxide films are thermally excited or photo-excited, and/or as the titanium oxide films undergo redox interactions with their environment.

FIG. 7A illustrates an example of a process in which thermal condensation of a titanium-based sol-gel material at low temperatures (e.g., less than about 500° C.) may lead to increased electronic absorption over time due to oxidation of organic components. In the illustrated example, the sol-gel material may include $Ti\text{-}OR^1_{(m)}\text{—}X_{(n)}$, water, and $R^2OH$, where $R^1$ and $R^2$ may be organic groups including alkyl or alkene groups that may optionally include carboxylate, alcohol, and/or ester functionalities and may optionally be catenated to form a heterocycle, and X may include a halide (e.g., fluoride, chloride, or bromide), sulfate, or phosphate. Upon annealing, the sol-gel material may condense to form metal oxide Ti-O$_{(o)}$-X$_{(p)}$ and residue organics. When the condensed sol-gel material is exposed to heat or UV light during subsequent process or in use, the titanium oxide and residual organics may interact through, for example, redox interaction, which may cause oxidation of the organics and increase in electronic absorption. As a result, the absorption of visible light by the sol-gel material may increase.

FIG. 7B illustrates an example where it may be desirable to prevent interactions of the Ti-O$_{(o)}$-X$_{(p)}$ centers with the environment or residual organics that may increase the absorption of the sol-gel overcoat layer. As illustrated, a surface-relief grating 710 with deep grating grooves may be coated with a sol-gel material 720, which may include, for example, a titanium precursor Ti-OR$^1_{(m)}$—X$_{(n)}$, water, and an organic material R$^2$OH, as described above with respect to FIG. 7A. Upon annealing, the sol-gel material may condense to form an overcoat layer 722 that may include metal oxide Ti-O$_{(o)}$—X$_{(p)}$. Overcoat layer 722 may superconformally fill the deep grating grooves without voiding formed therein. When the annealing temperature is not very high (e.g., less than about 500° C.), the organics in sol-gel material 720 may not have been fully removed, and thus overcoat layer 722 may include residue organics. When overcoat layer including the titanium oxide (or titanium oxysulfate) and residue organics is exposed to heat or UV light, electrons in the titanium oxide may be excited to the conduction band to generate free electrons and holes. The holes may generate hydroxyl radicals, and the electrons may facilitate the reduction of O$_2$ to form superoxide radical anions. These hydroxyl radicals and superoxide radicals may oxidize and degrade adjacent residue organics and/or inorganic materials, which may increase the light absorption of overcoat layer 722.

Therefore, in order for titanium oxide films to be used as optical coatings in applications that demand remarkably high transparency (e.g., absorption less than 0.1%/100 nm), the structure of titanium oxide films prepared using sol-gels may need to be optimized to lower their absorption and increase transparency. For example, it may be desirable to develop sol-gel materials that can protect or prevent the titanium oxide from interactions with its environment (e.g., residue organics) during film deposition, curing, and extended exposure to light and heat.

In some implementations, the sol-gel materials may be processed at high temperatures to eliminate or decompose the residue organics and minimize absorption. The annealing temperature for full densification and removal of the solvent and organics may depend on the chemical nature of the precursors used and the structure of the target oxide, and typically need to be higher than about 500° C. For example, full elimination of organics for TiO$_2$ films made from monomeric precursors has been observed at about 600° C. If the annealing temperature is lower, the organics may not be fully removed and the film transparency may be negatively impacted. However, annealing and other processing at high temperatures may not be compatible with other materials used in optical devices, since some materials (e.g., polymers) included in an optical device may degrade at temperatures greater than about 300° C. Therefore, new techniques to form titanium oxide films with high transparency at processing temperatures below about 300° C. may be needed.

In some implementations, the organics content of a sol-gel may be lowered by pre-condensing the sol-gel material prior to coating, thereby lowering the potential interactions of the metal oxides with organics that may increase film absorption. However, pre-condensing the sol-gel material prior to coating may reduce the recessed feature filling capabilities of the sol-gel material. For example, sol-gel materials containing multicore precursors or extended titanium oxide networks can be used in the coating formulation, but the compositions of these materials are typically unstable and tend to form nanoparticles in the solutions over time. Furthermore, molecular oxide clusters may be unstable towards water and molecular oxygen, or may aggregate over time. When aggregates and nanoparticles are formed, a good-quality superconformal fill of the recessed features may be difficult without a support resin. Thus, the applicability of sol-gel materials including polyoxo clusters in industrial applications may be severely hampered.

Figure 8A:
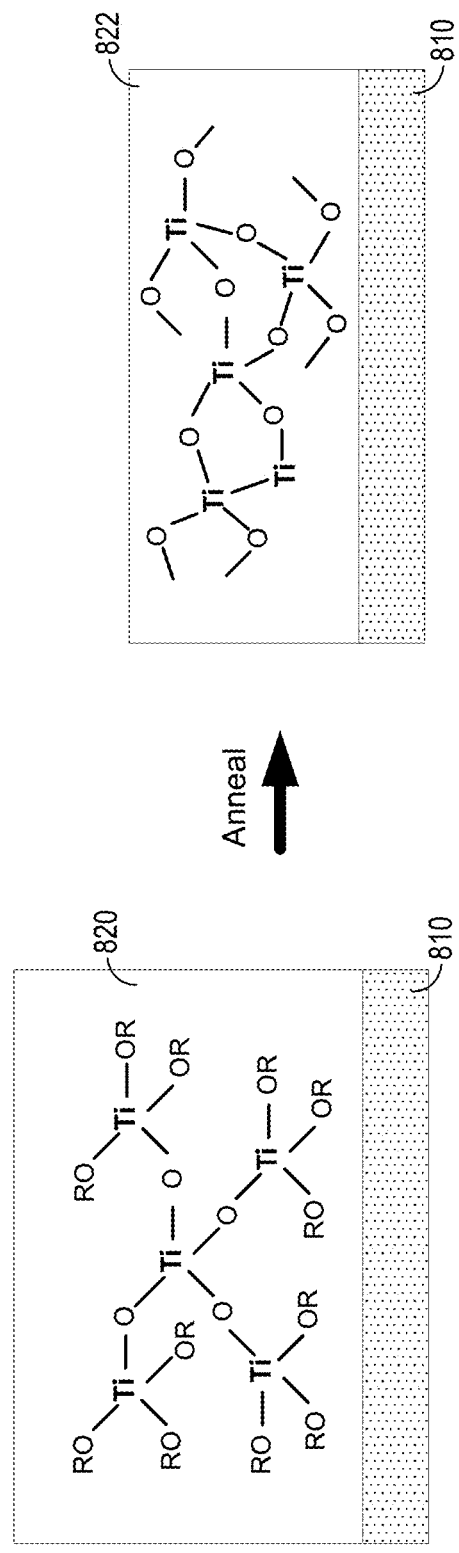
FIG. 8A illustrates an example of a sol-gel coating layer deposited on a flat substrate before and after annealing.
Figure 8B:
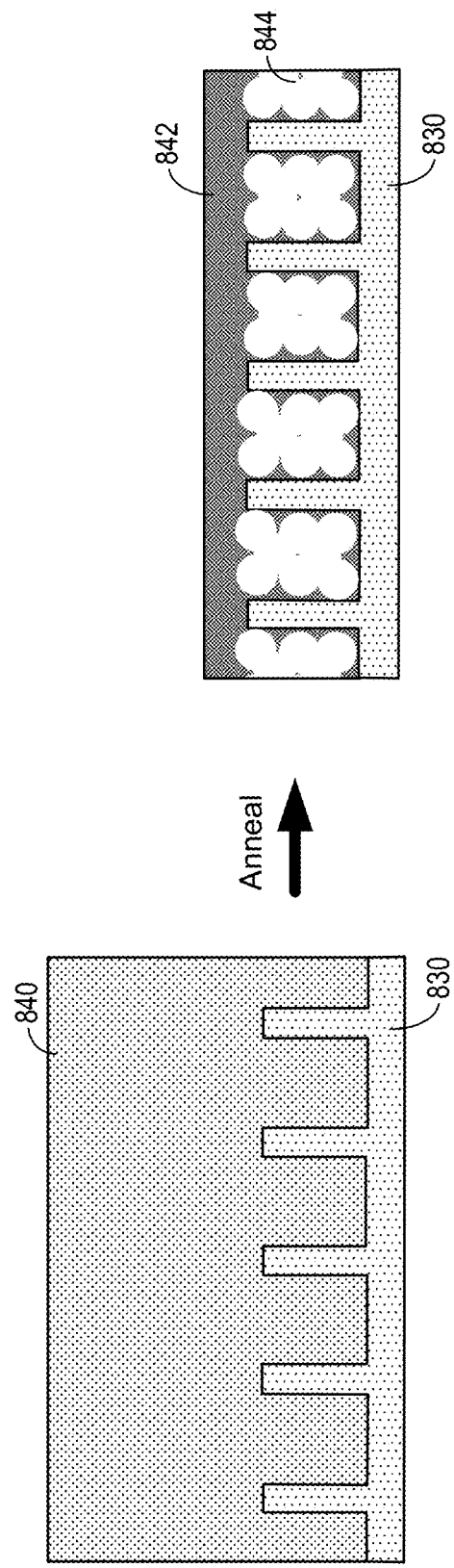
FIG. 8B illustrates a surface-relief grating including recessed features (e.g., grating grooves) formed in or on a substrate, and a sol-gel coating layer on the surface-relief grating before and after annealing.

FIGS. 8A and 8B illustrate some of the above-discussed challenges that may arise from conventional sol-gel materials. FIG. 8A illustrates an example of a sol-gel coating layer 820 deposited on a flat substrate 810 before and after annealing. In the illustrated example, the sol-gel material may include a titanium precursor. During and after the annealing, a titanium oxide network may be formed, and organic materials and solvents may be driven out of the titanium oxide network. Therefore, sol-gel coating layer 820 may condense and shrink during and after the annealing to form a high-refractive index coating layer 822 that includes mostly titanium oxide.

FIG. 8B illustrates a surface-relief grating 830 including recessed features (e.g., grating grooves) formed in or on a substrate, and a sol-gel coating layer 840 on the recessed features of surface-relief grating 830 before and after annealing. As shown in FIG. 8B, before annealing, if the thickness of sol-gel coating layer 840 is much higher than the depth of recessed features (e.g., grating grooves), it is possible to fill the high-aspect ratio recessed features with the sol-gel material. After annealing, sol-gel coating layer 840 may be condensed into an overcoating layer 842 that may include mainly metal oxide (e.g., titanium oxide) or metal oxysulfate (e.g., Ti—O—SO$_4$). As shown in FIG. 8B, after the annealing, voids 844 may form in the recessed features due to shrinkage of the sol-gel material and aggregations that may form nanoparticles or particulates.

According to certain embodiments, a titanium oxysulfate-based sol-gel material may be used to achieve and retain recessed feature fill throughout the sol-gel annealing process. The sulfate ion may prevent the material from forming particles during the condensation process such that voiding may be prevented.

For selective deposition techniques, such as spray coating, 3D printing, or inkjet printing, high-boiling point (e.g., >140° C.) solvents may need to be used in the sol-gel materials because, without a high-boiling point solvent, the sol-gel materials may dry within the deposition tools (e.g., inside the ink-jet printer nozzles). The high-boiling point solvents may need high annealing temperatures to remove. But extended heat treatment for materials with high-boiling point solvents may cause the absorption to increase above 0.1%/100 nm in the visible range of the light spectrum.

According to certain embodiments disclosed herein, a sol-gel material may be used to superconformally fill surface-relief structures with nano-sized or micro-sized features having high aspect ratio at relative low temperatures (e.g., less than about 300° C.), while achieving a low absorption for visible light, a high refractive index, minimum or no voiding, a high stability over time and temperature, selective deposition capability, and a flat top surface on the surface-relief structures. In one example, Ti-O$_{(o)}$-X$_{(p)}$ centers in a titanium oxide-based or titanium oxysulfate-based sol-gel overcoat layer may be stabilized to prevent the interactions between titanium oxide and the residue organics. In some embodiments, the sol-gel materials may stabilize titanium oxide or titanium oxysulfate via in-situ production of carboxylate (or carbonate) groups during sol-gel film curing, superconformally fill recessed features, and lower the absorption during deposition, processing, and extended exposure to light and/or heat. For example, the sol-gel materials disclosed herein may include hydrolytically unstable additives that may produce RCOO— groups in situ during processing, to prevent interactions of metal oxide with the environment or residual organics that may otherwise increase the film absorption to be greater than about 0.1%/100 nm for visible light, thereby leading to titanium oxide stabilization during processing and/or extended UV and heat exposure.

Figure 9A:
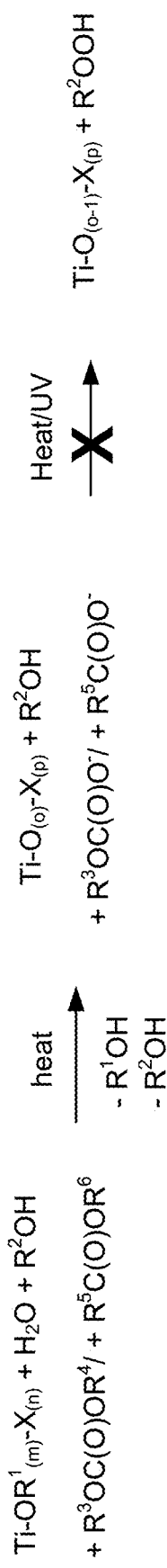
FIG. 9A illustrates an example of a process in which titanium oxide or titanium oxysulfate in a sol-gel film may be stabilized via in-situ production of carboxylate groups during sol-gel film curing to lower the absorption during deposition, processing, and extended exposure to light and/or heat according to certain embodiments.

FIG. 9A illustrates an example of a process in which titanium oxide or titanium oxysulfate in a sol-gel film may be stabilized via in-situ production of carboxylate groups during sol-gel film curing to lower the absorption during deposition, processing, and extended exposure to light and/or heat according to certain embodiments. In the illustrated example, the sol-gel material may include at least one titanium(IV) precursor, a source of sulfate or phosphate anions, and at least one additive or co-solvent that may function as a titanium oxide stabilizer. The titanium(IV) precursor and sulfate or phosphate anions may include, for example, $Ti\text{-}OR^1_{(m)}\text{---}X_{(n)}$, and may be able to form an amorphous and continuous phase that may not segregate into particulates inside recessed features during the annealing process, and thus may be able to produce superconformal recessed feature filling without voiding.

The at least one additive or co-solvent that may function as the titanium oxide stabilizer may include, for example, Formula 1 ($R^3OC(O)OR^4$), Formula 2 ($R^5C(O)OR^6$), or a combination thereof. Formula 1 represents an organic carbonate, where $R^3$ and $R^4$ may be separate alkyl chains or parts of a same heterocyclic ring, such as a cyclic organic carbonate as in propylene carbonate (PC). Formula 2 represents an organic ester, where $R^5$ and $R^6$ may be separate alkyl chains or parts of a same heterocyclic ring, such as a lactone as in gamma butyrolactone (GBL). The additives according to Formula 1 and/or Formula 2 may stabilize the titanium oxide material and prevent it from undergoing redox interactions with other formulation components (e.g., residue organics) or its environment, such that the absorption of the film may be less than about 0.1%/100 nm, even under extended exposure to heat or UV light.

In some embodiments, the solvent mixture of the overall formulation may include at least 40% by mass of organic solvents with a boiling point greater than about 140° C., such that the material can be selectively deposited onto a substrate via inkjet printing or other selective deposition techniques, without causing issues or damages to the deposition equipment, such as nozzle clogging due to premature solvent evaporation and sol-gel precipitation. Due to the titanium oxide or titanium oxysulfate stabilization, processing the sol-gel material at higher temperatures (e.g., greater than about 140° C.) to remove the high-boiling point solvents may not increase the absorption of the resultant material for visible light.

Figure 9B:
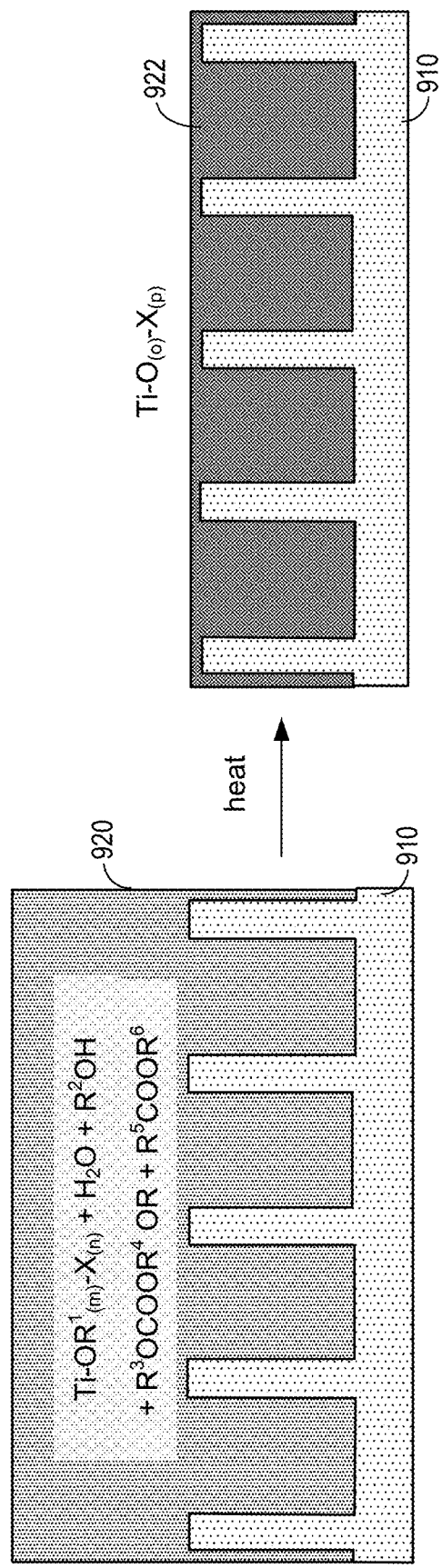
FIG. 9B illustrates an example of a surface-relief grating including recessed features formed in or on a substrate, and a sol-gel coating layer on the surface-relief grating before and after annealing, where the sol-gel coating layer includes a sol-gel material according to certain embodiments disclosed herein (e.g., shown in FIG. 9A).

FIG. 9B illustrates an example of a surface-relief grating 910 including recessed features formed in or on a substrate, and a sol-gel coating layer 920 on surface-relief grating 910 before and after annealing, where sol-gel coating layer 920 may include a sol-gel material according to certain embodiments disclosed herein (e.g., as shown in FIG. 9A). The recessed features may include microstructures or nanostructures having high depths and thus high aspect ratios. Sol-gel coating layer 920 may be annealed at an elevated temperature (e.g., greater than about 140° C. but lower than, for example, about 300° C.) to form an overcoat layer 922 on surface-relief grating 910. As shown in FIG. 9B, after annealing, the sol-gel coating layer may condense and shrink, but voids may not form in the recessed features and redox interactions between titanium oxide (or titanium oxysulfate) and residual organics may be prevented. Therefore, the sol-gel materials disclosed herein may achieve superconformal recessed feature fill for nanosized, high aspect-ratio features and may also reduce light absorption of the resultant overcoat layer 922.

In some embodiments, titanium(IV) oxysulfate (e.g., $Ti\text{-}OR^1_{(m)}\text{---}X_{(n)}$) may be used as the titanium(IV) precursor and the source of sulfate ions, and GBL and propylene carbonate (PC) may be used as the additives following Formula 1 and Formula 2. Both GBL and PC may be partially hydrolyzed in situ upon annealing, thereby generating carboxylate ligands that can stabilize the titanium oxide film against interactions with its environment that may otherwise produce oxidized organic byproducts, Ti(III) centers, or oxygen vacancies in the titanium oxide structure. As such, the addition of GBL and PC may lead to a film that is highly transparent in the visible spectrum and has an absorption rate less than about 0.1%/100 nm.

In some embodiments, other components such as acids, bases, peroxides, surfactants, and other solubilizing solvents (such as alcohols, glycols, and water) may optionally be added to the sol-gel material to tune the coating quality, uniformity, and optical properties of the sol-gel material. In one example, the formulation may include nitric acid, propylene glycol methyl ether (PGME), and water.

The sol-gel materials disclosed herein can be applied onto a substrate including nano-sized surface-relief structures formed thereon or therein to achieve superconformal fill of the nano-sized surface-relief structures. For example, in some embodiments, a two-stage thermal densification of the film (e.g., first at or below about 100° C. and then at above 100° C.) and an optional UV curing between the two annealing processes may be performed, where the sol-gel material may be retained in the surface-relief structures without any voiding and the resultant coating may be highly transparent (e.g., with an absorption rate less than about 0.1%/100 nm).

In some embodiments, a process may include preparing a sol-gel solution that may include at least one titanium(IV) precursor, a source of sulfate ions, one or more solubilizing agents, and one or more stabilizer agents of Formula 1 ($R^3OC(O)OR^4$) or Formula 2 ($R^5C(O)OR^6$) to prevent changes in film transparency; applying (e.g., via spin coating, dip coating, spray coating, inkjet printing, screen printing, or contact printing) the sol-gel solution onto a substrate including surface-relief structures formed hereon; and thermally annealing the substrate via at least two stages of thermal annealing at 2 different temperatures and optionally an additional UV curing step. In one example, a first annealing step at a temperature in the range of about 20-100° C. may be performed prior to performing a subsequent anneal step at a temperature in the range of about 200-300° C., and a UV curing step may optionally be applied between the two annealing steps. Once fully annealed, the film produced may have a refractive index between about 1.6 and about 1.9 or higher, and may be fully set such that it may not be removed from the substrate by washing with an organic solvent or any of the solvents used to form the coating. Superconformal and void-free filling of the surface-relief structures in the substrate may be achieved, while maintaining a high transparency (e.g., with an absorption rate less than about 0.1%/100 nm).

EXAMPLES

I. Comparative Examples 1-4

FIG. 10 shows material compositions, processes, and performance of comparative examples 1-4. In comparative example 1, 25% titanium(IV) oxysulfate (Ti—O—$SO_4$) and 0.75% nitric acid ($HNO_3$) were dissolved in water and further diluted in PGME, to achieve a final Ti(IV) complex concentration about 6.5% and about 0.125% by mass, respectively, in the two solutions as detailed in FIG. 10. The resultant solution in PGME was spin-coated onto a flat silicon substrate that includes nano-sized trenches ranging from about 15 nm to about 100 nm in width and about 220 nm in depth. The substrate was then annealed at 300° C. The refractive index (RI) of the coating layer was measured via ellipsometry. As shown in FIG. 10, the film formed using example 1 and the above processes had an RI about 1.81. The substrate was cross-sectioned and the quality of the trench filling by the sol-gel material was determined via SEM. The results showed that the sol-gel material penetrated the trenches in a superconformal fashion without any observable voids. The spin-coating and annealing processes were repeated using a transparent fused silica substrate, and the sol-gel coating absorption was measured via spectrophotometry. The film showed an absorption rate about 0.17-0.19% per 100 nm for 460-nm light, with decreasing absorption at longer light wavelengths. This baseline result shows that a titanium oxide film may achieve a relatively low absorption and high transparency, but the absorption may be above the 0.1%/100 nm level for high performance optical applications such as high efficiency coatings for diffractive gratings used in waveguide displays.

In comparative example 2, the protocol for example 1 was repeated with the addition of 2.5% isopropyl alcohol (IPA) and 0.5% of 30% $H_2O_2$ solution in water. As shown in FIG. 10, the film formed using example 2 and the above-described processes had an RI about 1.79. The substrate was cross-sectioned and the quality of the trench filling by the sol-gel material was determined via SEM. The result showed that the sol-gel material penetrated the trenches in a superconformal fashion without any observable voids. Furthermore, coating on a fused silica substrate resulted in a film with 0.03-0.00% absorption per 100 nm for 460-nm light, with no measurable absorption at longer light wavelengths. This baseline result shows that the sol-gel formulation may be adapted to decrease absorption when using certain coating substrates.

In comparative examples 3 and 4, the protocols and sol-gel formulations from examples 1 and 2, respectively, were repeated with an additional substrate pre-cleaning protocol that includes 5 minutes of $O_2$ plasma treatment. As shown in FIG. 10, while the RI and recessed-feature fill performance of the formulations were not affected by the pre-cleaning, the absorption of the films increased dramatically. For example, the coatings became visibly colored during the anneal process, regardless of the solvent and peroxide additives utilized in example 4. These results show that a more robust approach to prevent the increase of absorption in titanium oxide coatings during processing is needed in order to use the sol-gel materials for highly transparent optical coatings on a wider variety of substrates and surface chemistries.

II. Comparative Examples 5-7

FIG. 11 shows material compositions, processes, and performance of comparative examples 5-7. In each of comparative examples 5-7, titanium(IV) oxysulfate (e.g., about 25%) and nitric acid (e.g., about 0.75%) were dissolved in water and further diluted in PGME to achieve a final Ti(IV) complex concentration of about 6.5% and about 0.125% by mass, respectively, in the two solutions as detailed in FIG. 11. The resultant solution in PGME was spin-coated onto a flat silicon substrate that includes nano-sized trenches ranging from about 15 nm to about 100 nm in width and about 220 nm in depth, which had been pre-cleaned with a 5-minute $O_2$ plasma treatment. The substrate with the coating was then annealed via a two-stage anneal process that included an initial annealing at a temperature in the 75-200° C. range and a second annealing at a temperature about 300° C. The RI of the coating was measured via ellipsometry and the recessed feature-filling performance was assessed via SEM. As shown in FIG. 11, the two-stage annealing process did not lead to significant changes in RI or recessed-feature filling. The spin-coating and annealing processes were repeated using a transparent fused silica substrate, which had been pre-cleaned with a 5-minute $O_2$ plasma treatment, and the sol-gel coating absorption was measured via spectrophotometry. The two-stage anneal process lowered the film absorption as shown in FIG. 11, as compared to Example 4 shown in FIG. 10 which did not include the first low-temperature annealing. Furthermore, the lower the first anneal temperature was, the more pronounced the absorption decrease became. However, in all three examples shown in FIG. 11, the absorption remained significantly above 0.1% per 100 nm for light with a wavelength about 460 nm. These results show that, while processing conditions can be adapted to reduce titanium oxide film absorption, a more robust approach may be needed for high performance optical applications that may need highly transparent films.

III. Comparative Examples 8-13

FIG. 12 shows material compositions, processes, and performance of comparative examples 8-13. In each of comparative examples 8-13, titanium(IV) oxysulfate and nitric acid were dissolved in water and further diluted in PGME to achieve a final Ti(IV) complex concentration about 6.5% and about 0.125% by mass, respectively, in the two solutions as detailed in FIG. 12. The resultant solution also contained 40% by mass of a high-boiling point solvent to make the solution compatible with selective deposition techniques such as inkjet printing. For example, the high-boiling point solvents in comparative examples 8-13 may include dipropylene glycol monomethyl ether (DPGME), propylene glycol methyl ether acetate (PGMEA), tripropylene glycol monomethyl ether (TPM), 1,2-butane diol, 1,3-butane diol, and triethylene glycol, respectively. The resultant solution was spin-coated onto a flat silicon substrate that had been pre-cleaned with a 5-minute $O_2$ plasma treatment. The substrate was then annealed at 300° C. The RI of the sol-gel coating was measured via ellipsometry. As shown in FIG. 12, the different solvent mixtures did not lead to significant changes in the RI of the coating, except in the case of triethylene glycol. The spin-coating and annealing processes were repeated using a transparent fused silica substrate, which had been pre-cleaned with a 5-minute $O_2$ plasma treatment, and the sol-gel coating absorption was measured via spectrophotometry. In all of comparative examples 8-13, the different solvent mixtures resulted in high-absorption films that were significantly above the 0.1%/100 nm upper limit for high performance optical applications such as high efficiency coatings for diffractive gratings. These results show that a robust approach to stabilize titanium oxide films against increase in absorption may be needed for processing that may be compatible with a variety of solvents.

IV. Working Examples 14-16

FIG. 13 shows material compositions, processes, and performance of working examples 14-16 according to certain embodiments. In each of working examples 14-16, titanium(IV) oxysulfate and nitric acid were dissolved in water and further diluted in PGME to achieve a final Ti(IV) complex concentration about 6.5% and about 0.125% by mass, respectively, in the two solutions as detailed in FIG. 13. The resultant solution also contained additives which can be hydrolyzed in situ to release a carboxylic acid ligand, such as gamma butyrolactone (GBL) and propylene carbonate (PC); or a free carboxylic acid, such as acetic acid. The resultant solution was spin-coated onto a flat silicon substrate that had been pre-cleaned with a 5-minute $O_2$ plasma treatment. The substrate was then annealed at 300° C. The RI of the coating was measured via ellipsometry. As shown in FIG. 13, while acetic acid reduced the RI of the coating significantly, the addition of GBL or GBL with a low concentration of PC did not. The spin-coating and annealing processes were then repeated using a transparent fused silica substrate, which had been pre-cleaned with a 5-minute $O_2$ plasma treatment, and the sol-gel coating absorption was measured via spectrophotometry. In each of working examples 14-16, the sol-gel coating absorption was significantly below those of examples 5-13. These results show that incorporation of a carboxylic acid stabilizer, or more preferably an additive that can form a carboxylate or carbonate group in situ via hydrolysis, can have a significant impact on reducing the absorption of titanium oxide films during processing.

V. Working Examples 17-21

FIG. 14 shows material compositions, processes, and performance of working examples 17-21 according to certain embodiments. In each of working examples 17-21, titanium(IV) oxysulfate and nitric acid were dissolved in water and further diluted in PGME and GBL to achieve a final Ti(IV) complex concentration about 6.5% and about 0.125% by mass, respectively, in the two solutions as detailed in FIG. 14. The resultant solution was spin-coated (e.g., at 1500 rpm) onto a flat silicon substrate that had been pre-cleaned with a 5-minute $O_2$ plasma treatment. The substrate was then annealed via a two-stage anneal process that included an initial annealing at a temperature in the 75-140° C. range and a second annealing at a temperature about 300° C. The RI of the coating was measured via ellipsometry. As shown in FIG. 14, the two-stage annealing process did not lead to significant changes in the RI of the coating. The spin-coating and annealing processes were repeated using a transparent fused silica substrate, which had been pre-cleaned with a 5-minute $O_2$ plasma treatment, and the sol-gel coating absorption was measured via spectrophotometry. Results shown in FIG. 14 indicate that, the lower the temperature of the initial anneal stage may be, the lower the final film absorption may become, leading to an absorption rate about 0.22%-0.13%/100 nm for Example 17. The initial anneal stage at a lower temperature may serve to evaporate solvent at a temperature at which the reaction with the titanium oxide material may be slower, and may serve to produce in-situ protective groups (e.g., stabilizing groups such as carboxylate groups) by hydrolyzing the GBL prior to full film condensation in the second annealing stage.

VI. Working Examples 22-23

FIG. 15 shows material compositions, processes, and performance of working examples 22-23 according to certain embodiments. In each of working examples 22-23, titanium(IV) oxysulfate and nitric acid were dissolved in water and further diluted in PGME and GBL to achieve a final Ti(IV) complex concentration about 6.5% and about 0.125% by mass, respectively, in the two solutions as detailed in FIG. 15. The resultant solution was spin-coated (e.g., at 1500 rpm) onto a flat silicon substrate that had been pre-cleaned with a 5-minute $O_2$ plasma treatment. The substrate was then annealed via a two-stage annealing process that included an initial annealing at a temperature about 75° C. and a second annealing at a temperature about 300° C. Unlike in example 17, the length of the first annealing stage was increased from 1 minute to 2.5 minutes and 5 minutes in examples 22 and 23, respectively. The RI of the coating was measured via ellipsometry. As shown in FIG. 15, the increased anneal time for the first annealing stage did not lead to significant changes in the RI of the coating. The spin-coating and annealing processes were repeated using a transparent fused silica substrate, which had been pre-cleaned with a 5-minute $O_2$ plasma treatment, and the sol-gel coating absorption was measured via spectrophotometry. The longer anneal time for the first annealing stage led to lower film absorption, which was less than 0.1%/100 nm on average for example 23. The longer initial anneal time may further increase solvent evaporation at a temperature at which the reaction with the titanium oxide material may be slower, and may serve to further produce in-situ protective groups by hydrolyzing more GBL prior to full film condensation in the second annealing stage. The combination of the stabilizing additive and the anneal optimization allows the fabrication of a highly transparent film that is also compatible with selective deposition due to the high boiling point of GBL.

VII. Working Examples 24-26

Figures 16A, 16B, 16C, 16D:
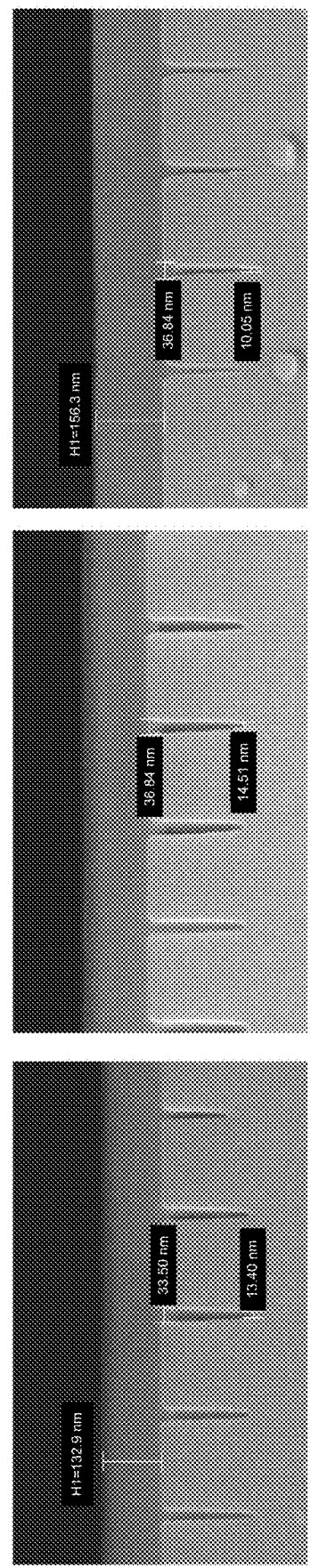
FIG. 16A shows material compositions, processes, and performance of working examples 24-26 according to certain embodiments.
FIGS. 16B-16D show cross-sectional views (e.g., via SEM) of examples of surface-relief gratings with superconformal overcoat layers formed in working examples 24-26, respectively, according to certain embodiments.

FIG. 16A shows material compositions, processes, and performance of working examples 24-26 according to certain embodiments. FIGS. 16B-16D show cross-sectional views (e.g., via SEM) of examples of surface-relief gratings with superconformal overcoat layers formed in working examples 24-26, respectively, according to certain embodiments. In each of working examples 24-26, titanium(IV) oxysulfate and nitric acid were dissolved in water and further diluted in PGME and GBL to achieve a final Ti(IV) complex concentration of about 6.5% and about 0.125% by mass, respectively, in the two solutions as detailed in FIG. 16A. The solution also included PC in the range of 1%-10% by mass. The resultant solution was spin-coated (e.g., at 1500 rpm) onto a flat silicon substrate that included nano-sized trenches ranging from about 15 nm to 100 nm in width and about 220 nm in depth, where the substrate had been pre-cleaned with a 5-minute $O_2$ plasma treatment. The substrate was then annealed via a two-stage annealing process that included an initial annealing at a temperature about 75° C. and a second annealing at a temperature about 300° C. The RI of the coating was measured via ellipsometry. As shown in FIG. 16A, the increased anneal time for the first anneal did not lead to significant changes in the RI of the coating. The recessed feature-filling performance was assessed via SEM as shown in FIGS. 16B-16D, which revealed that the sol-gel filled the recessed features in a superconformal fashion without producing any voids. The spin-coating and annealing processes were repeated using a transparent fused silica substrate, which had been pre-cleaned with a 5-minute $O_2$ plasma treatment, and the sol-gel coating absorption was measured via spectrophotometry. The combination of GBL and PC leads to robust stabilization of titanium oxide against the increase in absorption. In all of working examples 24-26, highly transparent films with absorption below about 0.1%/100 nm were produced without compromising other optical properties, film quality, or recessed feature-filling performance. The combination of the stabilizing additive and the anneal optimization allows one to produce a highly transparent film which is also compatible with selective deposition due to the high boiling point of GBL and PC.

VIII. Working Examples 27-30

FIG. 17 shows material compositions, processes, and performance of working examples 27-30 according to certain embodiments. In each of working examples 27-30, titanium(IV) oxysulfate and nitric acid were dissolved in water and further diluted in a variety of solvent mixtures to achieve a final Ti(IV) complex concentration about 6.5% and about 0.125% by mass, respectively, in the two solution, as detailed in FIG. 17. The solvent compositions and stabilization additives were chosen to produce a wide range of corresponding film absorptions ranging from greater than 20%/100 nm to below 0.1%/100 nm. The resultant solution was spin-coated onto a flat silicon substrate that had been pre-cleaned with a 5-minute $O_2$ plasma treatment. The substrate was then annealed via different annealing protocols, as detailed in FIG. 17. The coating composition was then determined via X-ray photoelectron spectroscopy (XPS). As shown in FIG. 17, the absorption decreased from example 27 to example 30, the Ti $2p$ XPS signals progressively shifted from about 458.1 eV to about 459.4 eV and from about 463.9 eV to about 465.4 eV. This progressive shift indicates that the absorption decrease indeed results from stabilization of the titanium oxide against oxygen vacancy formation or reduction to Ti(III). Furthermore, example 27 and example 28 show Cls XPS features at about 288.5 eV (indicative of oxidized C(O)O centers), even though none of the organic components initially included a carboxylate group. This further indicates that the organics in the titanium oxide sol-gel material can be oxidized during processing, which can lead to the increase in absorption unless a titanium oxide stabilizer is included in the coating solution.

Figure 18:
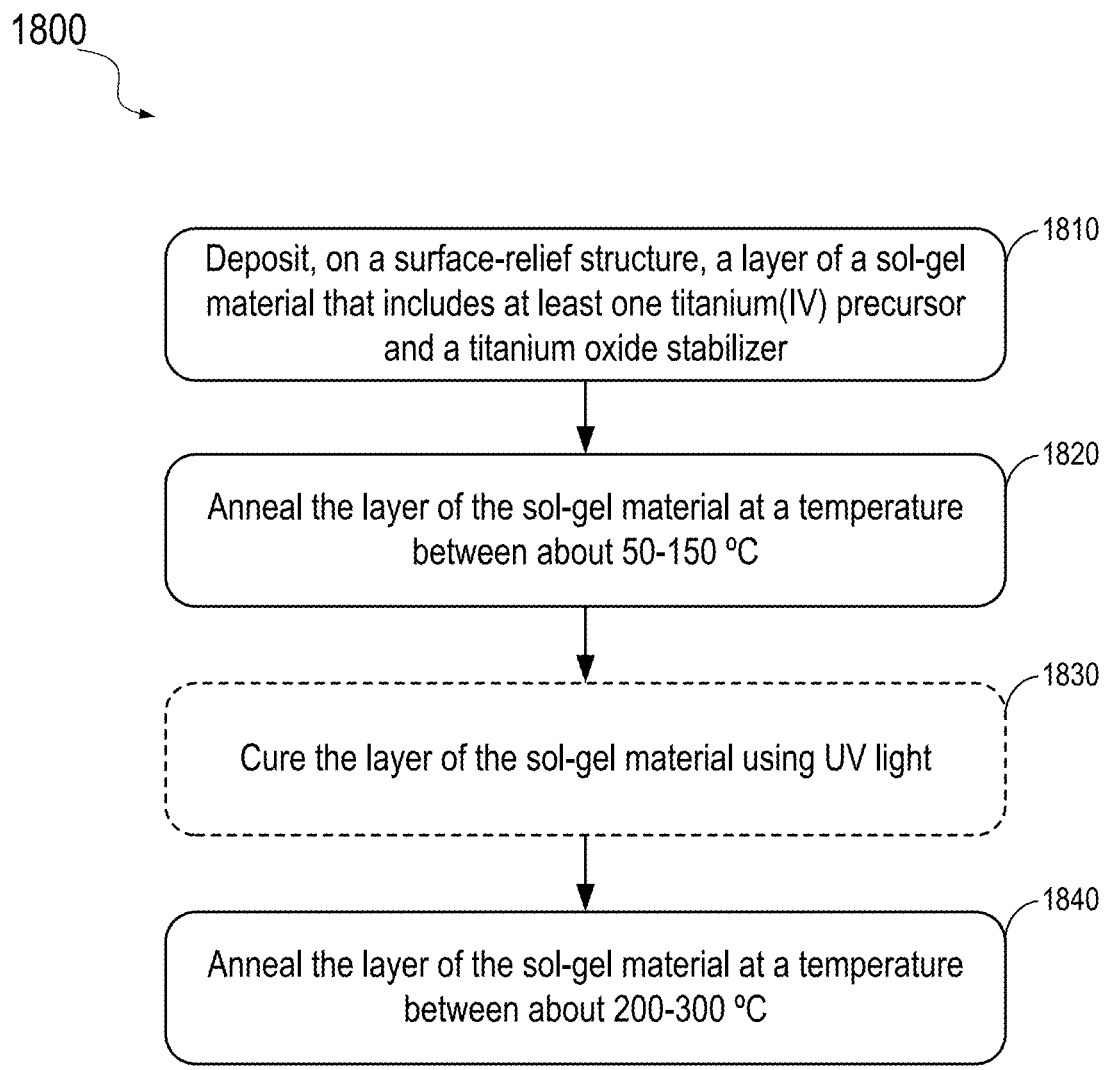
FIG. 18 includes a flowchart illustrating an example of a process of forming an overcoat layer on a surface-relief structure using a sol-gel material according to certain embodiments.

FIG. 18 includes a flowchart 1800 illustrating an example of a process of forming an overcoat layer on a surface-relief structure using a sol-gel material according to certain embodiments. It is noted that the operations illustrated in FIG. 18 provide particular processes for fabricating overcoat layers on surface-relief structures. Other sequences of operations can also be performed according to alternative embodiments. For example, alternative embodiments may perform the operations in a different order. Moreover, the individual operations illustrated in FIG. 18 can include multiple sub-operations that can be performed in various sequences as appropriate for the individual operation. Furthermore, some operations can be added or removed depending on the particular applications. In some implementations, two or more operations may be performed in parallel. One of ordinary skill in the art would recognize many variations, modifications, and alternatives.

Operations in block 1810 may include depositing, on a surface-relief structure, a layer of a sol-gel material disclosed herein. For example, the sol-gel material may include at least one titanium(IV) precursor and a titanium oxide stabilizer, such as Formula 1 ($R^3OC(O)OR^4$) or Formula 2 ($R^5C(O)OR^6$). Formula 1 represents an organic carbonate, where $R^3$ and $R^4$ are separate alkyl chains or part of a same heterocyclic ring, such as a cyclic organic carbonate as in propylene carbonate (PC). In some embodiments, $R^3$ and $R^4$ may include alkyl or alkene groups that may optionally contain carboxylate, alcohol, or ester functionalities and may optionally be catenated to form a heterocycle. Formula 2 represents an organic ester, where $R^5$ and $R^6$ are separate alkyl chains or parts of a same heterocyclic ring, such as a lactone as in gamma butyrolactone (GBL). In some embodiments, $R^5$ and $R^6$ may include alkyl or alkene groups that may optionally contain carboxylate, alcohol, or ester functionalities and may optionally be catenated to form a heterocycle. In some embodiments, the sol-gel material may also include a source of sulfate or phosphate anions. The titanium(IV) precursor and sulfate or phosphate anions may be able to form an amorphous and continuous phase that may not segregate into particulates inside recessed features during the annealing process, and thus may be able to produce superconformal recessed feature filling without voiding. The additives according to Formula 1 and Formula 2 may stabilize the titanium oxide material and prevent it from undergoing interactions with other formulation components (e.g., organics) or its environment (e.g., oxygen and moisture), such that the absorption of the film may be less than about 0.1%/100 nm. In some embodiments, depositing the layer of the sol-gel material may include depositing the layer of the sol-gel material on selected regions of the surface-relief structure; depositing different amounts of the sol-gel material on different regions of the surface-relief structure; or a combination thereof. The selective deposition technique may include, for example, spray coating, three-dimensional printing, screen printing, ink-jet printing, or a combination thereof.

Operations in blocks 1820-1840 may include annealing the layer of the sol-gel material at a temperature lower than or equal to 300° C. to superconformally fill the surface-relief structure with the sol-gel material. For example, at block 1820, the layer of the sol-gel material may be annealed at a temperature between about 50-150° C., for about one minute to about a few minutes. As described above, annealing at a lower temperature for a longer period of time may serve to evaporate solvent at a temperature at which the reaction with the titanium oxide material may be slower, and may serve to produce in-situ protective groups (e.g., stabilizing groups such as carboxylate groups) by hydrolyzing the stabilizers prior to full film condensation. In some embodiments, the layer of the sol-gel material may optionally be cured using UV light. At block 1840, the layer of the sol-gel material may be cured at a temperature between about 200-300° C. to remove the organic components and solvents and fully condense the sol-gel material into a metal oxide network that has a high refractive index and low absorption, and conformally fills the surface-relief structure without voiding.

Embodiments of the invention may include or be implemented in conjunction with an artificial reality system. Artificial reality is a form of reality that has been adjusted in some manner before presentation to a user, which may include, for example, a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, for example, create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, systems, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing various embodiments. Various changes may be made in the function and arrangement of elements without departing from the spirit and scope of the present disclosure.

Also, some embodiments were described as processes depicted as flow diagrams or block diagrams. Although each may describe the operations as a sequential process, many of the operations may be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It will be apparent to those skilled in the art that substantial variations may be made in accordance with specific requirements. For example, customized or special-purpose hardware might also be used, and/or particular elements might be implemented in hardware, software (including portable software, such as applets), or both. Further, connection to other computing devices such as network input/output devices may be employed.

With reference to the appended figures, components that can include memory can include non-transitory machine-readable media. The term "machine-readable medium" and "computer-readable medium," as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media such as compact disk (CD) or digital versatile disk (DVD), punch cards, paper tape, any other physical medium with patterns of holes, a RAM, a programmable read-only memory (PROM), an erasable programmable read-only memory (EPROM), a FLASH-EPROM, any other memory chip or cartridge, a carrier wave as described hereinafter, or any other medium from which a computer can read instructions and/or code. A computer program product may include code and/or machine-executable instructions that may represent a procedure, a function, a subprogram, a program, a routine, an application (App), a subroutine, a module, a software package, a class, or any combination of instructions, data structures, or program statements.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms "and" and "or" as used herein may include a variety of meanings that are also expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean A, B, C, or a combination of A, B, and/or C, such as AB, AC, BC, AA, ABC, AAB, or AABBCCC.

Further, while certain embodiments have been described using a particular combination of hardware and software, it should be recognized that other combinations of hardware and software are also possible. Certain embodiments may be implemented only in hardware, or only in software, or using combinations thereof. In one example, software may be implemented with a computer program product containing computer program code or instructions executable by one or more processors for performing any or all of the steps, operations, or processes described in this disclosure, where the computer program may be stored on a non-transitory computer readable medium. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques, including, but not limited to, conventional techniques for inter-process communications, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A sol-gel material for overcoating surface-relief structures, the sol-gel material comprising:
   a titanium (IV) precursor; and
   a titanium oxide stabilizer including $R^3OC(O)OR^4$, $R^5C(O)OR^6$, or a combination,
   wherein $R^3$, $R^4$, $R^5$, and $R^6$ include alkyl or alkene groups, and
   wherein the sol-gel material, when coated onto a substrate and annealed at a temperature below about 300° C. for less than about 10 minutes, forms a coating with a refractive index in a range of 1.6-1.9 and an absorption for visible light less than about 0.1% per 100 nm.

2. The sol-gel material of claim 1, wherein $R^3$ and $R^4$ include carboxylate, alcohol, or ester functionalities.

3. The sol-gel material of claim 1, wherein $R^3$ and $R^4$ are parts of a heterocycle.

4. The sol-gel material of claim 1, wherein the titanium oxide stabilizer includes $R^3OC(O)OR^4$ in a range of 0.1-10% by mass of the sol-gel material.

5. The sol-gel material of claim 1, wherein the titanium oxide stabilizer includes propylene carbonate or a lactone.

6. The sol-gel material of claim 1, wherein $R^5$ and $R^6$ include carboxylate, alcohol, or ester functionalities.

7. The sol-gel material of claim 1, wherein $R^5$ and $R^6$ are parts of a heterocycle.

8. The sol-gel material of claim 1, wherein the titanium oxide stabilizer includes $R^5C(O)OR^6$ in a range of 0.1-50% by mass of the sol-gel material.

9. The sol-gel material of claim 1, wherein:
   the titanium (IV) precursor includes $Ti-OR^1_{(m)}-X_{(n)}$, wherein $m \geq 0$ and $n > 0$;
   $R^1$ includes an alkyl or alkene group; and
   X includes a halide, sulfate, or phosphate.

10. The sol-gel material of claim 1, wherein the sol-gel material is configured to fill recessed features on the substrate in a superconformal fashion without leading to voiding upon full thermal densification of the sol-gel material.

11. The sol-gel material of claim 1, further comprising a source of sulfate or phosphate anions, an acid, a base, a peroxide, a surfactant, a cross-linker, a flexibilizer, a toughener additive, a solvent, or a combination thereof.

12. The sol-gel material of claim 1, further comprising one or more solvents with boiling points greater than 140° C.

* * * * *